US012634849B2

(12) United States Patent
Tang et al.

(10) Patent No.: US 12,634,849 B2
(45) Date of Patent: May 19, 2026

(54) CHANNEL RASTER AND SYNCHRONIZATION SIGNAL RASTER FOR NR UNLICENSED SPECTRUM

(71) Applicant: APPLE INC., Cupertino, CA (US)

(72) Inventors: Yang Tang, San Jose, CA (US); Dae Won Lee, Portland, OR (US); Prerana Rane, Santa Clara, CA (US); Bishwarup Mondal, San Ramon, CA (US); Jiwoo Kim, San Jose, CA (US); Yongjun Kwak, Portland, OR (US); Seunghee Han, San Jose, CA (US)

(73) Assignee: APPLE INC., Cupertino, CA (US)

( * ) Notice: Subject to any disclaimer, the term of this patent is extended or adjusted under 35 U.S.C. 154(b) by 412 days.

(21) Appl. No.: 18/534,181

(22) Filed: Dec. 8, 2023

(65) Prior Publication Data

US 2024/0172147 A1 May 23, 2024

Related U.S. Application Data

(62) Division of application No. 17/593,080, filed as application No. PCT/US2020/032736 on May 13, 2020, now Pat. No. 12,185,262.

(Continued)

(51) Int. Cl.
*H04W 56/00* (2009.01)
*H04L 27/26* (2006.01)

(52) U.S. Cl.
CPC ..... *H04W 56/001* (2013.01); *H04L 27/26025* (2021.01); *H04L 27/2607* (2013.01)

(58) Field of Classification Search
CPC .......... H04W 56/001; H04L 27/26025; H04L 27/2607; H04L 5/001; H04L 27/261; H04L 5/005; H04L 5/0092; H04L 5/0007
See application file for complete search history.

(56) References Cited

U.S. PATENT DOCUMENTS

2018/0048435 A1 2/2018 Toufiqul
2018/0139084 A1 5/2018 Jung et al.
(Continued)

FOREIGN PATENT DOCUMENTS

WO 2018213678 A1 11/2018
WO 2019050197 A1 3/2019

OTHER PUBLICATIONS

U.S. Appl. No. 17/593,080, Notice of Allowance, Jul. 29, 2024, 9 pages.

(Continued)

*Primary Examiner* — Sharmin Chowdhury
(74) *Attorney, Agent, or Firm* — Dorsey & Whitney LLP

(57) ABSTRACT

Systems and methods for determining channel raster(s) and synchronization signal raster(s) for New Radio (NR) unlicensed spectrum are disclosed herein. For each of a plurality of data objects an NR channel raster position is determined using Absolute Radio Frequency Channel Number (NR-ARFCN) numbers. For each corresponding NR channel, Global Synchronization Channel Numbers (GSCNs), a number of Physical Resource Blocks (PRBs) based on channel subcarrier spacing (SCS), NR channel raster position placement, channel edges, synchronization signal and physical broadcast channel (SSB) edges, and an SSB raster position are calculated. The plurality of data objects may then be down selected based on e.g., corresponding Long Term Evolution (LTE) channel raster positions and/or entries of a second plurality of data objects calculated for NR channels that use a second SCS.

20 Claims, 8 Drawing Sheets

Related U.S. Application Data

(60) Provisional application No. 62/847,770, filed on May 14, 2019.

(56) References Cited

U.S. PATENT DOCUMENTS

| | | | |
|---|---|---|---|
| 2018/0338304 A1 | 11/2018 | Gheorghiu et al. | |
| 2019/0028315 A1 | 1/2019 | Park et al. | |
| 2019/0103931 A1 | 4/2019 | Yi et al. | |
| 2019/0124609 A1 | 4/2019 | Gheorghiu et al. | |
| 2019/0159148 A1 | 5/2019 | Jung et al. | |
| 2020/0084739 A1 | 3/2020 | Si et al. | |
| 2020/0228222 A1* | 7/2020 | Chiang | H04W 48/16 |
| 2021/0037488 A1 | 2/2021 | Ko et al. | |

OTHER PUBLICATIONS

Huawei, Hisilicon, "Performance enhancements for NB-IoT coexistence with NR", R1-1903912, 3GPP TSG RAN WG1 Meeting #96bis, Xi'an, China, Agenda Item 6.2.2.4, Apr. 8-12, 2019, 5 pages.

PCT/US2020/032736, International Search Report and Written Opinion, Nov. 19, 2020, 33 pages.

PCT/US2020/032736, Invitation to Pay Additional Fees and Where Applicable Protest Fee, Sep. 15, 2020, 27 pages.

U.S. Appl. No. 17/593,080, Non-Final Office Action, Oct. 12, 2023, 15 pages.

U.S. Appl. No. 17/593,080, Final Office Action, Apr. 29, 2024, 16 pages.

* cited by examiner

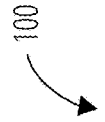
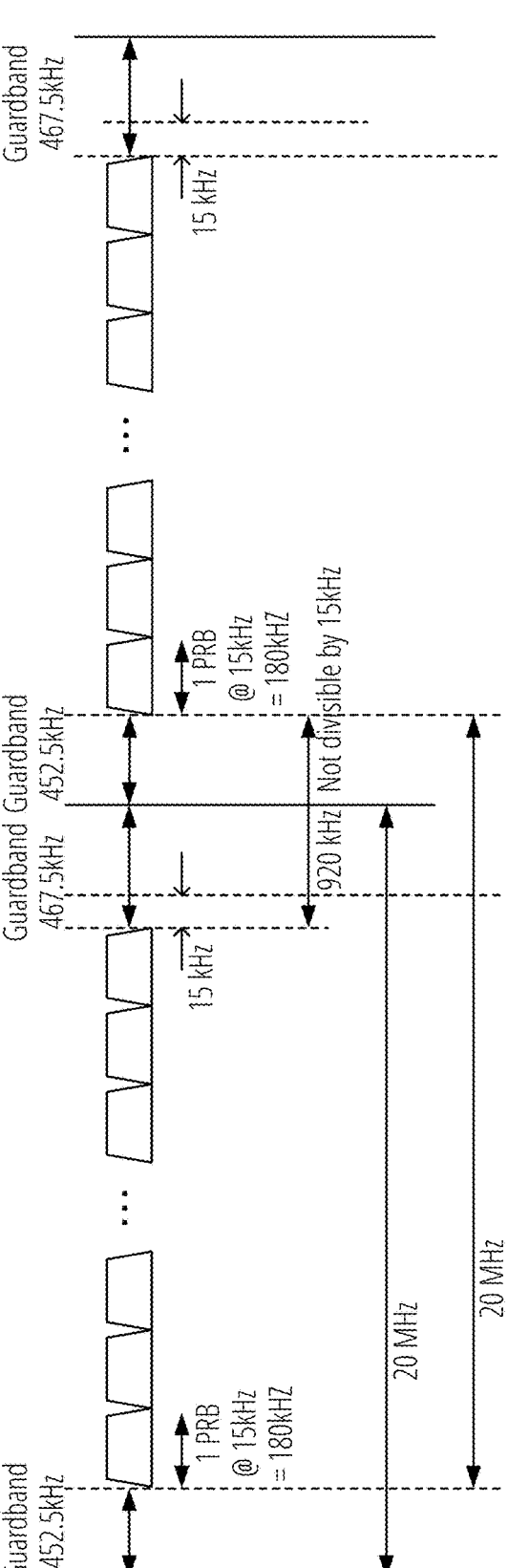
Note: Bandwidths not according to scale
FIG. 1

Note: Bandwidths not according to scale

300

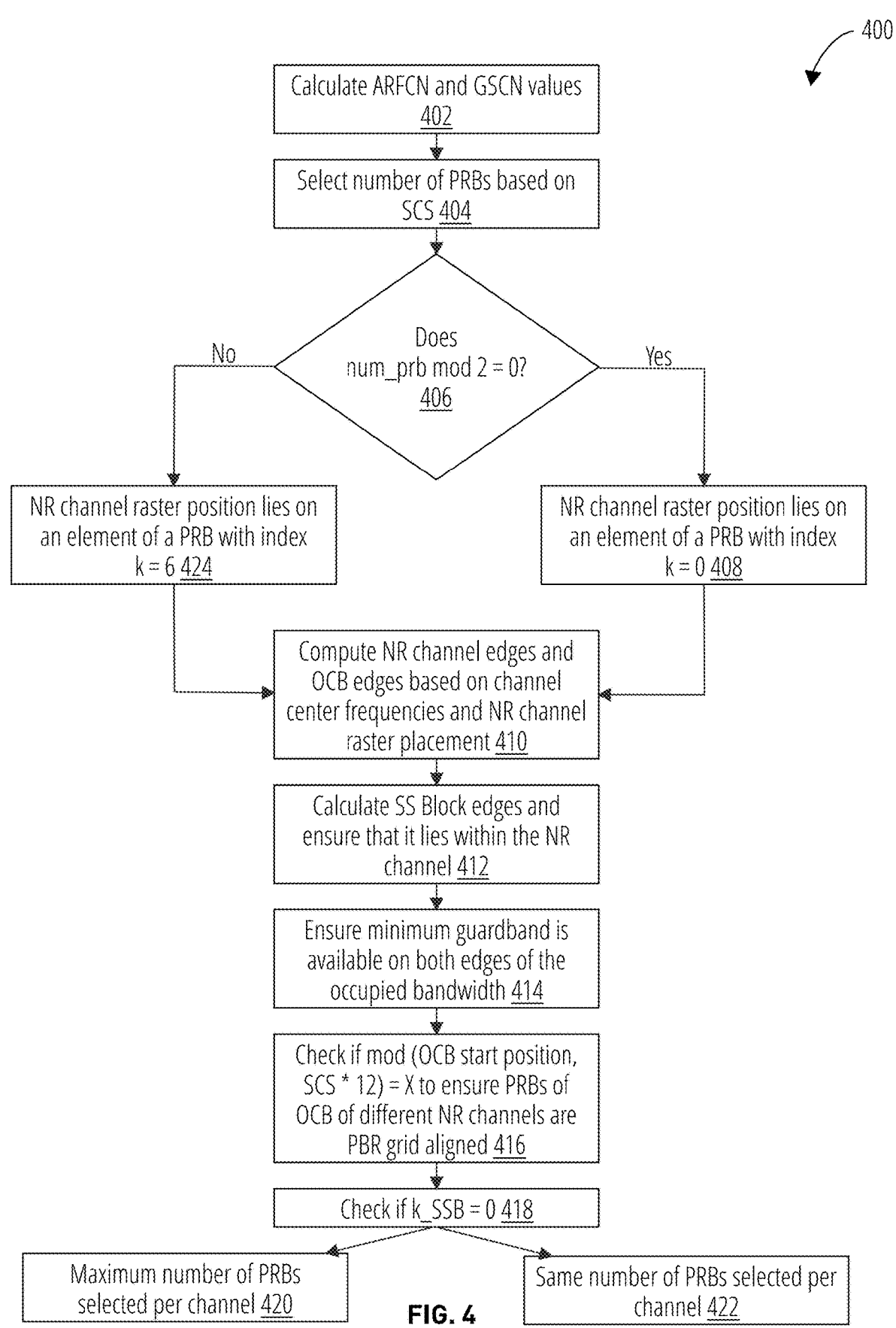

400

Calculate ARFCN and GSCN values
402

Select number of PRBs based on
SCS 404

Does
num_prb mod 2 = 0?
406

No                                          Yes

NR channel raster position lies on
an element of a PRB with index
k = 6 424

NR channel raster position lies on
an element of a PRB with index
k = 0 408

Compute NR channel edges and
OCB edges based on channel
center frequencies and NR channel
raster placement 410

Calculate SS Block edges and
ensure that it lies within the NR
channel 412

Ensure minimum guardband is
available on both edges of the
occupied bandwidth 414

Check if mod (OCB start position,
SCS * 12) = X to ensure PRBs of
OCB of different NR channels are
PBR grid aligned 416

Check if k_SSB = 0 418

Maximum number of PRBs
selected per channel 420

Same number of PRBs selected per
channel 422

CHANNEL RASTER AND SYNCHRONIZATION SIGNAL RASTER FOR NR UNLICENSED SPECTRUM

CROSS-REFERENCE TO RELATED APPLICATION(S)

This application is a divisional of the U.S. application Ser. No. 17/593,080, filed Sep. 8, 2021, which is a national stage filing under 35 U.S.C. § 371 of International Patent Application No. PCT/US2020/032736, filed May 13, 2020, which claims the benefit of U.S. Provisional Application No. 62/847,770, filed May 14, 2019, each of which is hereby incorporated by reference herein in its entirety.

TECHNICAL FIELD

This application relates generally to wireless communication systems, and more specifically to channel raster and synchronization signal raster use for New Radio unlicensed spectrum.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 illustrates a diagram of two adjacent New Radio (NR) cells operating with 15 kHz subcarrier spacing (SCS) that are placed in the center of the 20 MHz band.

FIG. 4 illustrates a method of determining characteristics of a New Radio (NR) channel according to embodiments disclosed herein.

DETAILED DESCRIPTION

Figure 2:
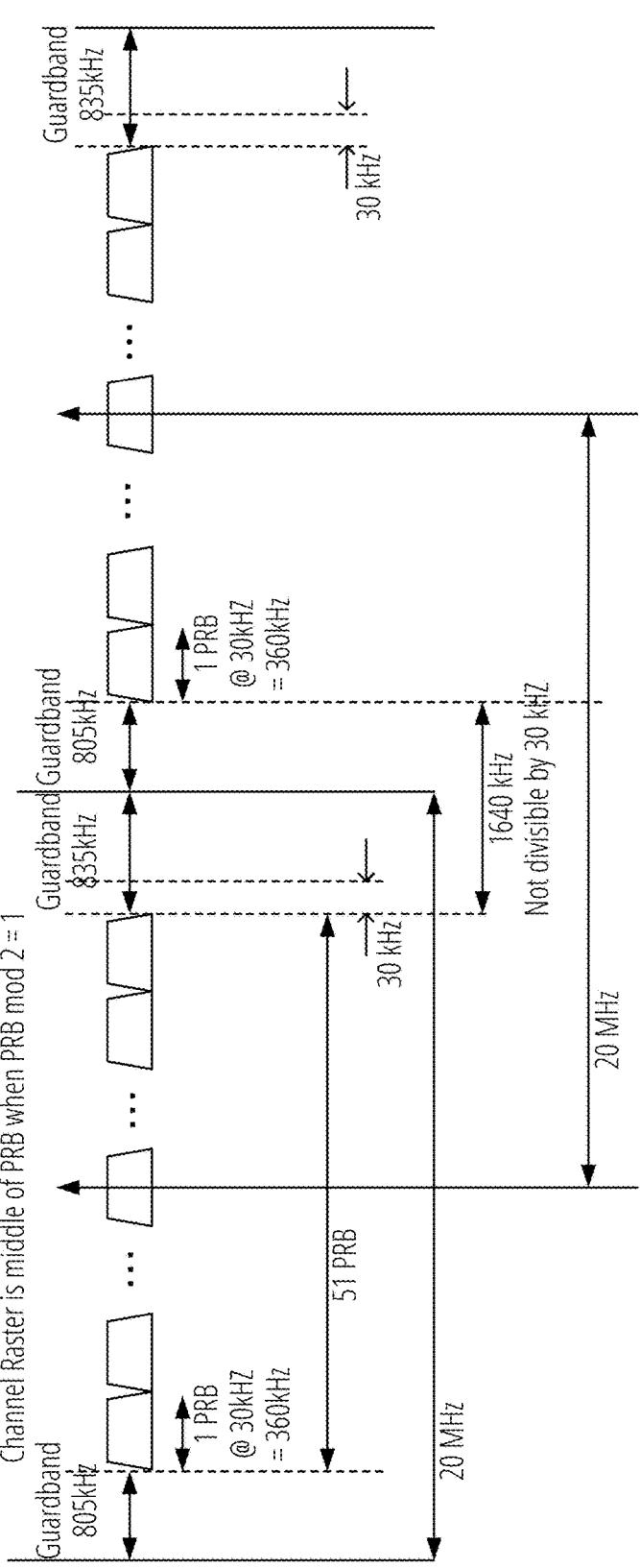
FIG. 2 illustrates a diagram of two adjacent New Radio (NR) cells operating with a 30 kHz subcarrier spacing (SCS) that are placed in the center of the 20 MHz band.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

LTE channel raster are center frequency positions in which wireless system can deploy a cell. These are the center frequency of the carrier and may correspond to the DC subcarrier of the cell. In unlicensed bands, LTE channel raster are in units of non-overlapping 20 MHz, with two non-overlapping 20 MHz usually adjacent to each other (without any frequency gap between). More specifically, the LTE channel raster are on {5160, 5180, 5200, 5220, 5240, 5260, 5280, 5300, 5320, 5340} MHz for the UNII-1 band, {5480, 5500, 5520, 5540, 5560, 5580, 5600, 5620, 5640, 5660, 5680, 5700, 5720} MHz for the UNII-2 band, and {5745, 5765, 5785, 5805, 5825, 5845, 5865, 5885, 5905} MHz for the UNII-3 band.

Radio Frequency (RF) reference frequencies are designated by an NR Absolute Radio Frequency Channel Number (NR-ARFCN) in the range [0 . . . 3279165] on the global frequency raster (i.e., the NR channel raster). The relation between the NR-ARFCN and the RF reference frequency $F_{REF}$ in MHz is given by the following equation, where $F_{REF-Offs}$ and $N_{REF-Offs}$ are given in following table and $N_{REF}$ is the NR-ARFCN:

$$F_{REF} = F_{REF-Offs} + \Delta F_{Global}(N_{REF} - N_{REF-Offs})$$

synchronization block position is not present. A global synchronization raster is defined for all frequencies. The frequency position of the Synchronization Signal (SS) block is defined as $SS_{REF}$ with a corresponding Global Synchronization Channel Number (GSCN). The parameters defining the $SS_{REF}$ and GSCN for all the frequency ranges are in Table 3. The synchronization raster and the subcarrier spacing of the synchronization block are defined separately for each band.

TABLE 3

| GSCN Parameter for Global Frequency Raster | | | |
|---|---|---|---|
| Frequency range | SS block frequency position $SS_{REF}$ | GSCN | Range of GSCN |
| 0-3000 MHz | N * 1200 kHz + M * 50 kHz, N = 1:2499, M ∈ {1, 3, 5} (Note) | 3 N + (M-3)/2 | 2-7498 |
| 3000-24250 MHz | 3000 MHz + N * 1.44 MHz N = 0:14756 | 7499 + N | 7499-22255 |
| 24250-100000 MHz | 24250.08 MHz + N * 17.28 MHz N = 0:4383 | 22256 + N | 22256-26639 |

NOTE:
The default value for operating bands with SCS spaced channel raster is M = 3.

TABLE 1

| NR-ARFCN Parameters for the Global Frequency Raster | | | | |
|---|---|---|---|---|
| Frequency range (MHz) | $\Delta F_{Global}$ (kHz) | $F_{REF-Offs}$ (MHz) | $N_{REF-Offs}$ | Range of $N_{REF}$ |
| 0-3000 | 5 | 0 | 0 | 0-599999 |
| 3000-24250 | 15 | 3000 | 600000 | 600000-2016666 |
| 24250-100000 | 60 | 24250.08 | 2016667 | 2016667-3279165 |

The channel raster defines a subset of RF reference frequencies that can be used to identify the RF channel position in the uplink and downlink. The RF reference frequency for an RF channel maps to a resource element on the carrier. The mapping between the RF reference frequency on the channel raster and the corresponding resource element is given in Table 2 and can be used to identify the RF channel position.

TABLE 2

| Channel Raster to Resource Element Mapping | | |
|---|---|---|
| | $N_{RB}$ mod2 = 0 | $N_{RB}$ mod2 = 1 |
| Resource element index k | 0 | 6 |
| Physical resource block number $n_{PRB}$ | $n_{PRB} = \left\lfloor \dfrac{N_{RB}}{2} \right\rfloor$ | $n_{PRB} = \left\lfloor \dfrac{N_{RB}}{2} \right\rfloor$ |

The mapping depends on the total number of resource blocks (RBs) that are allocated in the channel and applies to both uplink (UL) and downlink (DL). The mapping must apply to at least one numerology supported by the base station (BS). Additionally, k is the subcarrier index (or resource element index in the frequency domain), $n_{PRB}$ is the physical resource block (PRB) index, and $N_{RB}$ (also denoted herein as N_RB or $N_{RB}$) is the number of PRBs in the cell.

The synchronization raster indicates the frequency positions of the synchronization block that can be used by the UE for system acquisition when explicit signaling of the The mapping between the synchronization raster and the corresponding resource element of the SS block is given in Table 4. The mapping depends on the total number of RBs that are allocated in the channel and applies to both UL and DL.

TABLE 4

| Synchronization Raster to SS block Resource Element Mapping | |
|---|---|
| Resource element index k of the SS block | 0 |
| Physical resource block number $n_{PRB}$ of the SS block | $n_{PRB} = 10$ |

Due to the granularity of the NR channel raster frequency locations, it is not possible, without modification, to perfectly align them with LTE channel raster for the same unlicensed band. However, due to coexistence between Wi-Fi systems and LTE Unlicensed systems that may be operating in the same band, NR unlicensed systems may find it beneficial to use similar if not identical channel raster entries.

It may be possible to change the NR channel raster positions for the unlicensed band such that they are identical to the LTE channel raster positions. However, in such deployments (with the same LTE channel raster positions) due to required guard bands for NR cells, two adjacent cells cannot be placed on the same subcarrier grid nor same PRB grids. This can be easily seen in illustrations in FIG. 1 and FIG. 2. FIG. 1 illustrates a diagram 100 of two adjacent NR cells operating with a 15 kHz subcarrier spacing that are placed in the center of the 20 MHz band. In such a case, the gap between two occupied frequencies is not divisible by the operated subcarrier spacing, which is 15 kHz.

An analogous situation is shown in FIG. 2. FIG. 2 illustrates a diagram 200 of two adjacent NR cells operating with a 30 kHz subcarrier spacing that are placed in the center of the 20 MHz band. In this case, the subcarrier grid (which is the regular pattern and period of center of subcarrier positions) between the two cells would not be aligned and therefore, the transceiver would may not be able to perform a single inverse FFT and FFT operation to process signals from two cells simultaneously. (Note that in FIG. 1 and FIG. 2, the "center" of the 20 MHz band does not necessary mean exactly in the center so as to have same guard bandwidths at either edges of the bandwidth. The center of the NR carrier will be shifted by ½ subcarrier due to the fact that there is always even number of subcarriers. Accordingly, to position the channel raster position in the center of subcarrier, the entire bandwidth will be shifted by ½ subcarrier.)

Accordingly, the selection of the NR channel raster positions becomes an important factor in allowing support of subcarrier and PRB grid alignment, in order to enable efficient transceiver design for multiple component carrier operations (i.e. multiple cell operations).

In addition, the process of selecting NR channel raster positions also needs to factor into account synchronization signal and physical broadcast channel (referred to herein as SSB and/or SS Block) raster entries (also referred to herein as SSB raster entries, SSB raster positions, SSB raster values, SSB raster points, and/or SS rasters). SSB raster entries are the center of the SSB that needs to be positioned within the cell. The subcarrier grid of the SSB also needs to be aligned with subcarrier grid of the rest of the cell to insure orthogonal transmission of SSB and rest of the system, when same subcarrier spacing is used for both. Therefore, the combination of the SSB raster position and NR channel raster position should be selected such that the operating cell fits within the 20 MHz LTE channels (to enable efficient coexistence), allow subcarrier and PRB grid alignment between cells, and allow subcarrier (and possibly PRB grid) alignment between SSB and rest of the signals and channels of the cell.

This process is not trivial and requires significant engineering work. This disclosure address how the NR channel and SSB raster entries can be chosen, and proposed channel and SSB raster entries that provide numerous benefits to transceiver design.

There are no known solutions that address PRB grid alignment between cells, PRB grid alignment between SSB and rest of the signal/channel of the cell, and alignment of 20 MHz channel deployments between LTE, NR, and Wi-Fi systems.

The proposed NR channel and SSB raster entries would allow cells deployed in carrier aggregation to be implemented using a single FFT (and inverse FFT) in the transceivers. Additionally, by also supporting PRB grid alignment between cells and PRB grid alignment between SSB and rest of the signals in the channel, it would allow efficient use of spectrum and simplify transceiver implementation even further.

The NR channel raster is given as $F_{REF}=F_{REF-Offs}+\Delta F_{Global}$ ($N_{REF}-N_{REF-Offs}$), where the $\Delta F_{Global}=15$ kHz, $F_{REF-Offs}=3000$ MHz, and $N_{REF-Offs}=600000$.

The $N_{REF}$ for a system operating with 30 kHz is selected among the set of {744000, 745344, 746664, 748008, 749328, 750672, 751992, 753336, 754656, 754668, 754680, 756000, 765336, 766656, 766668, 766680, 768000, 769344,

6

770664, 772008, 773328, 774672, 775992, 777336, 778656, 778668, 778680, 780000, 781344, 783000, 784344, 785664, 787008, 788328, 789672, 790992, 792336, 793656, 793668, 793680, 744660, 746004, 747324, 748668, 749988, 750000, 750012, 751332, 752676, 753996, 755340, 765996, 767340, 768660, 770004, 771324, 772668, 773988, 774000, 774012, 775332, 776676, 777996, 779340, 780660, 783660, 785004, 786324, 787668, 788988, 789000, 789012, 790332, 791676, 792996}.

The $N_{REF}$ for system operating with 15 kHz is selected among set of {744000, 744006, 745344, 746664, 746670, 748008, 749328, 749334, 750672, 751992, 51998, 753336, 754656, 754662, 756000, 756006, 765336, 766656, 766662, 768000, 768006, 69344, 770664, 770670, 772008, 773328, 773334, 774672, 775992, 775998, 777336, 78656, 778662, 780000, 780006, 781344, 783000, 783006, 784344, 785664, 785670, 787008, 788328, 788334, 789672, 790992, 790998, 792336, 793656, 793662, 744660, 744666, 746004, 747324, 47330, 748668, 749988, 749994, 750000, 750012, 751332, 751338, 752676, 753996, 754002, 755340, 765996, 766002, 767340, 768660, 768666, 770004, 771324, 771330, 772668, 773988, 773994, 774000, 774012, 775332, 775338, 776676, 777996, 778002, 779340, 780660, 780666, 783660, 783666, 785004, 786324, 786330, 787668, 788988, 788994, 789000, 789012, 790332, 790338, 791676, 792996, 793002}

The SSB raster is given by "3000 MHz+N*1.44 MHz", where N is a value from range 0 to 14756 and GSCN is given as "7499+N". The GSCN is selected as K+a value from set {8996, 9010, 9023, 9037, 9051, 9065, 9079, 9093, 9107, 9121, 9218, 9232, 9232, 9232, 9246, 9260, 9273, 9287, 9301, 9315, 9329, 9343, 9357, 9357, 9357, 9371, 9385, 9402, 9416, 9430, 9444, 9457, 9471, 9485, 9499, 9513, 9513, 9513, 8996, 9010, 9023, 9037, 9051, 9065, 9079, 9093, 9107, 9218, 9232, 9246, 9260, 9273, 9287}, where K=0 . . . 6.

This disclosure allows simplified transceiver implementation that would save power consumption and reduce initial access acquisition (e.g., the time it takes to find suitable cell(s)) latency for NR in an unlicensed spectrum.

Possible channel and SSB raster entries that provide benefits to transceiver implementation may be computed as follows:

Calculate NR-ARFCN values between 5-6 GHz (Unlicensed Spectrum) using the formula $F_{REF}=F_{REF-Offs}\Delta F_{Global}$ ($N_{REF}-N_{REF-Offs}$).

Calculate GSCN values on a 1.44 MHz (or a multiple of 1.44 MHz) grid using the formula, 3000 MHz+N*1.44 MHz, where N=0:14756. Note: The NR-ARFCN values are placed on a 15/30/60 kHz grid. In LTE, the channels were placed on a 100 kHz grid. The NR channel center frequency values should be as close to the LTE channel center frequencies as possible.

Based on subcarrier spacing and channel bandwidth, the maximum transmission bandwidth is determined. The following table may be used for this purpose.

TABLE 5

| | Maximum transmission bandwidth configuration $N_{RB}$ | | | | | | | | | | | |
| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

7

8

The following table is used to determine the placement of the channel raster based on the number of PRBs.

TABLE 6

| Channel Raster to Resource Element Mapping | | |
|---|---|---|
| | $N_{RB}$ mod2 = 0 | $N_{RB}$ mod2 = 1 |
| Resource element index k | 0 | 6 |
| Physical resource block number $n_{PRB}$ | $n_{PRB} = \left\lfloor \dfrac{N_{RB}}{2} \right\rfloor$ | $n_{PRB} = \left\lfloor \dfrac{N_{RB}}{2} \right\rfloor$ |

The edges of the channel and the Occupied Channel BW (OCB) are calculated based on the placement of the channel raster.

The SSB block is 20 PRBs wide and is positioned such that the raster lies on the $0^{th}$ subcarrier of the $10^{th}$ PRB. The SS Block must lie within the channel. The SSB raster values lie on a 1.44 MHz grid and the channel raster points lie on a 15/30/60 kHz grid. SSB raster points are selected such that they also coincide with the channel raster grid. Raster points are assumed to lie at the center of the subcarrier.

Guard band values are calculated from the edges of the channel. Minimum guardband requirement must be met.

significantly simplify the initial access procedures and latency involved in searching for a valid SSB.

For the 30 kHz data subcarrier spacing case, an NR channel raster entry point is selected that allows for support for at least 50 PRBs within a 20 MHz LTE channel band and at least 105 PRBs within a 40 MHz channel band. For the 15 kHz data subcarrier spacing case, an NR channel raster entry point is selected that allows support for at least 104 PRBs within a 20 MHz LTE channel band and at least 214 PRBs within 40 MHz channel band. The determination of whether a certain number of PRBs can be utilized for an NR channel raster entry point can be performed by computing the available guard bands to the left and right of the occupied system bandwidth. The computed guard band must be larger the minimum guard band requirement specified in TS38.101-1 and 38.104.

Further, NR channel raster entry points are selected that allow alignment of PRB grids between different component carriers. This may be performed by selecting NR channel raster entry points with a specific number of PRBs that have a multiple integer of 12×30 kHz difference between first subcarriers of the occupied system bandwidth. This may also be performed by choosing channel raster entry points that have multiple integer of 12×2 values of $N_{REF}$.

TABLE 7

| Minimum Guardband for Each UE Channel Bandwidth and SCS (kHz) | | | | | | | | | | | |
|---|---|---|---|---|---|---|---|---|---|---|---|
| SCS (kHz) | 5 MHz | 10 MHz | 15 MHz | 20 MHz | 25 MHz | 30 MHz | 40 MHz | 50 MHz | 60 MHz | 80 MHz | 90 MHz | 100 MHz |
| 15 | 242.5 | 312.5 | 382.5 | 452.5 | 522.5 | 592.5 | 552.5 | 692.5 | N/A | N/A | N/A | N/A |
| 30 | 505 | 665 | 645 | 805 | 785 | 945 | 905 | 1045 | 825 | 925 | 885 | 845 |
| 60 | N/A | 1010 | 990 | 1330 | 1310 | 1290 | 1610 | 1570 | 1530 | 1450 | 1410 | 1370 |

Note: Calculation of channel, OCB, and guardbands must account for the 1 subcarrier utilized for Channel raster.

$k_{SSB}$ (also denoted herein as k_SSB) is the number of subcarriers between the SSB block edges and the channel edges on both sides of the OCB. Calculate the $k_{SSB}$ values.

The number of PRBs within the channel are calculated by subtracting the guardbands from the OCB.

Figure 3:
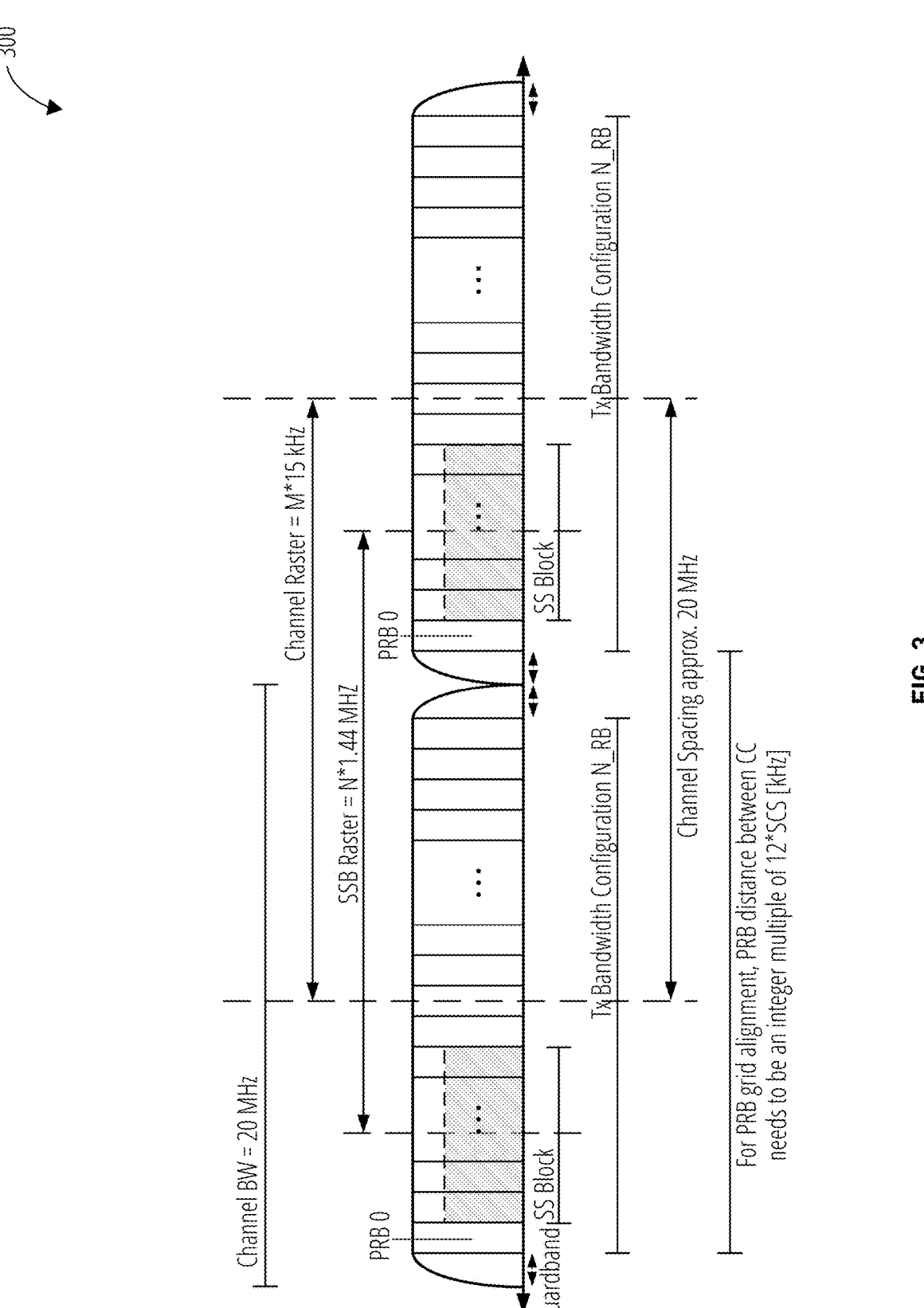
FIG. 3 illustrates a diagram of a pair of New Radio (NR) channels having channel raster positions and synchronization signal and physical broadcast channel (SSB) raster positions calculated using methods disclosed herein

FIG. 3 illustrates a diagram 300 of a pair of NR channels having channel raster positions and SSB raster positions calculated using methods disclosed herein. For example, the NR channels of FIG. 3 may correspond to calculations made using the process just described.

The steps listed above generate all possible channel raster & SSB raster entries which meet the below four criteria:

First, the SS block must lie within the occupied channel bandwidth.

Second, the PRBs in the SS Block and the Channel must be aligned on the same grid (resulting in $k_{SSB}$=0).

Third, the PRBs in cells in different channels must be aligned on the same PRB grid. This can be checked by making sure the frequency difference between the first subcarriers of the occupied channel bandwidth in different cells are multiple integer of a single PRB bandwidth.

Fourth, minimum guardband requirements must be met. Conditions for Down-Selecting Entries From all Possible Channel Raster & SSB Raster Entries The possible channel raster and SSB raster entries that may be computed (e.g., as discussed above) can be further down-selected. The additional down-selection allows for a single NR channel entry per 20 MHz for support, which may Further, NR channel raster entry points are selected that allow for PRB grid alignment between SSB PRBs and a common PRB grid. This is equivalent to finding raster entry points that allow the $k_{SSB}$ parameter to be equal to 0.

The conditions regarding alignment of PRB grids between different component carriers and PRB grid alignment between SSB PRBs and a common PRB grid can be simultaneously satisfied if an NR channel raster entry point is selected with a specific number of PRBs that have remainder of 120 kHz when a first subcarrier frequency position of the occupied system bandwidth is divided by 12×30 kHz (or, equivalently, a remainder of $N_{REF}$ divided by 12×2 is 0).

Finally, a set of SSB raster entry points (a range of GSCN values) are found that allow the SSBs to be placed within the occupied system bandwidth when paired with selected NR channel raster entry point with a specific number of PRBs. Down-Selection Process Flow The following condition(s) and/or alternative(s) are used to down-select the entries from all available channel & SSB raster entries:

First, the PRB's of the channel and SS block must be aligned on the same grid. This requirement is met if the OCB starting position is has the same remainder value when divided by "subcarrier spacing*12".

If the first condition is met, channel raster points can be further down-selected to ensure $k_{SSB}$=0. There are then two alternatives with respect to the number of PRBs: either 1) ensure all channels have same number of PRBs, or 2) select the maximum number of PRBs available, based on SCS. Selecting option 1 aligns the PRBs for 15 kHz and 30 kHz channel spacing using the same channel raster points for 20 MHz and 40 MHz channel bandwidth.

FIG. 4 illustrates a method 400 of determining characteristics of an NR channel according to embodiments disclosed herein. The method 400 includes calculating ARFCN and GSCN values in block 402.

The method 400 further includes selecting a number of PRBs based on a SCS in block 404.

The method 400 further includes determining whether the number of PRBs mod 2 is equal to zero (in other words, whether the number of PRBs is even) in decision block 406. If so the method proceeds to determine that the NR channel raster position lies on an element of a PRB with index k=0 in block 408. If not, the method proceeds to determine that the NR channel raster position lies on an element of a PRB with index k=6 in block 424.

The method 400 further includes computing NR channel edges and OCB edges based on the NR channel center frequency and the NR channel raster placement in block 410.

The method 400 further includes calculating SS Block edges to ensure that it lies within the NR channel in block 412.

The method 400 further includes ensuring that a minimum guardband is available on both edges of the OCB in block 414.

The method 400 further includes checking if mod (OCB start position, SCS*12)=X to ensure that the PRBs of OCB of different NR channels are PBR grid aligned in block 416.

The method 400 further includes checking if k_SSB=0 in block 418.

The method 400 may further include one of block 420 and block 422. In block 420, a maximum number of PRBs may be selected per channel. This may result in maximum spectral efficiency. In block 422, a same number of PRBs is selected per NR channel. This may result in alignment of PRBs for 15 kHz and 30 kHz using the same NR channel raster points (20 MHz and 40 MHz).

Example Set of Channel Raster & SSB Raster Entries for 30 kHz

Table 8 and Table 9 are one example of channel and SSB raster entries for 30 kHz.

Column LTE Chn Raster [kHz] contains the relevant channel raster entry for LTE, BW column specifies the channel bandwidth that the channel raster entry can be applicable for. In case of 20/60/100 entry, this means that the entry is applicable for 20 MHz, 60 MHz, and 100 MHz. In case of 40/80 entry, this means that entry is applicable for 40 MHz and 80 MHz. NR Chn Raster and NR-ARFCN columns provide the NR channel raster frequency position and its corresponding NREF value. N_PRB columns shows the number of PRBs that could be used for the channel. SS Raster and GSCN column shows one example position of SSB frequency position and its corresponding GSCN value. It should be noted that any value of GSCN between value specified by Min GSCN and Max GSCN value can be used for the NR channel raster entry (row). It should be further noted that if GSCN (Min GSCN+K) is used for one of the NR channel raster entry, the same value of K should be used for all channel raster entries specified in the tables.

TABLE 8

| Entry No. | UNII-Band | LTE Chn Raster [kHz] | BW [MHz] | Data SCS [kHz] | NR Chn Raster [kHz] | NR-ARFCN ($N_{REF}$) | N_PRB | SS Raster [kHz] | GSCN | Min GSCN | Max GSCN |
|---|---|---|---|---|---|---|---|---|---|---|---|
| 1 | 1 | 5160000 | 20/60/100 | 30 | 5160000 | 744000 | 50 | 5155680 | 8996 | 8996 | 9002 |
| 2 | 1 | 5180000 | 20/60/100 | 30 | 5180160 | 745344 | 50 | 5175840 | 9010 | 9010 | 9016 |
| 3 | 1 | 5200000 | 20/60/100 | 30 | 5199960 | 746664 | 50 | 5194560 | 9023 | 9023 | 9030 |
| 4 | 1 | 5220000 | 20/60/100 | 30 | 5220120 | 748008 | 50 | 5214720 | 9037 | 9037 | 9044 |
| 5 | 1 | 5240000 | 20/60/100 | 30 | 5239920 | 749328 | 50 | 5234880 | 9051 | 9051 | 9058 |
| 6 | 1 | 5260000 | 20/60/100 | 30 | 5260080 | 750672 | 50 | 5255040 | 9065 | 9065 | 9072 |
| 7 | 1 | 5280000 | 20/60/100 | 30 | 5279880 | 751992 | 50 | 5275200 | 9079 | 9079 | 9086 |
| 8 | 1 | 5300000 | 20/60/100 | 30 | 5300040 | 753336 | 50 | 5295360 | 9093 | 9093 | 9100 |
| 9 | 1 | 5320000 | 20/60/100 | 30 | 5319840 | 754656 | 50 | 5315520 | 9107 | 9107 | 9113 |
| 10 | 1 | 5320000 | 20/60/100 | 30 | 5320020 | 754668 | 51 | 5315520 | 9107 | 9107 | 9114 |
| 11 | 1 | 5320000 | 20/60/100 | 30 | 5320200 | 754680 | 50 | 5315520 | 9107 | 9107 | 9114 |
| 12 | 1 | 5340000 | 20/60/100 | 30 | 5340000 | 756000 | 50 | 5335680 | 9121 | 9121 | 9127 |
| 13 | 2 | 5480000 | 20/60/100 | 30 | 5480040 | 765336 | 50 | 5475360 | 9218 | 9218 | 9225 |
| 14 | 2 | 5500000 | 20/60/100 | 30 | 5499840 | 766656 | 50 | 5495520 | 9232 | 9232 | 9238 |
| 15 | 2 | 5500000 | 20/60/100 | 30 | 5500020 | 766668 | 51 | 5495520 | 9232 | 9232 | 9239 |
| 16 | 2 | 5500000 | 20/60/100 | 30 | 5500200 | 766680 | 50 | 5495520 | 9232 | 9232 | 9239 |
| 17 | 2 | 5520000 | 20/60/100 | 30 | 5520000 | 768000 | 50 | 5515680 | 9246 | 9246 | 9252 |
| 18 | 2 | 5540000 | 20/60/100 | 30 | 5540160 | 769344 | 50 | 5535840 | 9260 | 9260 | 9266 |
| 19 | 2 | 5560000 | 20/60/100 | 30 | 5559960 | 770664 | 50 | 5554560 | 9273 | 9273 | 9280 |
| 20 | 2 | 5580000 | 20/60/100 | 30 | 5580120 | 772008 | 50 | 5574720 | 9287 | 9287 | 9294 |
| 21 | 2 | 5600000 | 20/60/100 | 30 | 5599920 | 773328 | 50 | 5594880 | 9301 | 9301 | 9308 |
| 22 | 2 | 5620000 | 20/60/100 | 30 | 5620080 | 774672 | 50 | 5615040 | 9315 | 9315 | 9322 |
| 23 | 2 | 5640000 | 20/60/100 | 30 | 5639880 | 775992 | 50 | 5635200 | 9329 | 9329 | 9336 |
| 24 | 2 | 5660000 | 20/60/100 | 30 | 5660040 | 777336 | 50 | 5655360 | 9343 | 9343 | 9350 |
| 25 | 2 | 5680000 | 20/60/100 | 30 | 5679840 | 778656 | 50 | 5675520 | 9357 | 9357 | 9363 |
| 26 | 2 | 5680000 | 20/60/100 | 30 | 5680020 | 778668 | 51 | 5675520 | 9357 | 9357 | 9364 |
| 27 | 2 | 5680000 | 20/60/100 | 30 | 5680200 | 778680 | 50 | 5675520 | 9357 | 9357 | 9364 |
| 28 | 2 | 5700000 | 20/60/100 | 30 | 5700000 | 780000 | 50 | 5695680 | 9371 | 9371 | 9377 |
| 29 | 2 | 5720000 | 20/60/100 | 30 | 5720160 | 781344 | 50 | 5715840 | 9385 | 9385 | 9391 |
| 30 | 3 | 5745000 | 20/60/100 | 30 | 5745000 | 783000 | 50 | 5740320 | 9402 | 9402 | 9409 |
| 31 | 3 | 5765000 | 20/60/100 | 30 | 5765040 | 784344 | 50 | 5760480 | 9416 | 9416 | 9423 |
| 32 | 3 | 5785000 | 20/60/100 | 30 | 5784960 | 785664 | 50 | 5780640 | 9430 | 9430 | 9436 |
| 33 | 3 | 5805000 | 20/60/100 | 30 | 5805120 | 787008 | 50 | 5800800 | 9444 | 9444 | 9450 |
| 34 | 3 | 5825000 | 20/60/100 | 30 | 5824920 | 788328 | 50 | 5819520 | 9457 | 9457 | 9464 |
| 35 | 3 | 5845000 | 20/60/100 | 30 | 5845080 | 789672 | 50 | 5839680 | 9471 | 9471 | 9478 |
| 36 | 3 | 5865000 | 20/60/100 | 30 | 5864880 | 790992 | 50 | 5859840 | 9485 | 9485 | 9492 |
| 37 | 3 | 5885000 | 20/60/100 | 30 | 5885040 | 792336 | 50 | 5880000 | 9499 | 9499 | 9506 |

TABLE 8-continued

| Entry No. | UNII-Band | LTE Chn Raster [kHz] | BW [MHz] | Data SCS [kHz] | NR Chn Raster [kHz] | NR-ARFCN ($N_{REF}$) | N_PRB | SS Raster [kHz] | GSCN | Min GSCN | Max GSCN |
|---|---|---|---|---|---|---|---|---|---|---|---|
| 38 | 3 | 5905000 | 20/60/100 | 30 | 5904840 | 793656 | 50 | 5900160 | 9513 | 9513 | 9520 |
| 39 | 3 | 5905000 | 20/60/100 | 30 | 5905020 | 793668 | 51 | 5900160 | 9513 | 9513 | 9520 |
| 40 | 3 | 5905000 | 20/60/100 | 30 | 5905200 | 793680 | 50 | 5900160 | 9513 | 9513 | 9520 |
| 41 | 1 | 5170000 | 40/80 | 30 | 5169900 | 744660 | 105 | 5155680 | 8996 | 8996 | 9016 |
| 42 | 1 | 5190000 | 40/80 | 30 | 5190060 | 746004 | 105 | 5175840 | 9010 | 9010 | 9030 |
| 43 | 1 | 5210000 | 40/80 | 30 | 5209860 | 747324 | 105 | 5194560 | 9023 | 9023 | 9044 |
| 44 | 1 | 5230000 | 40/80 | 30 | 5230020 | 748668 | 105 | 5214720 | 9037 | 9037 | 9058 |
| 45 | 1 | 5250000 | 40/80 | 30 | 5249820 | 749988 | 105 | 5234880 | 9051 | 9051 | 9072 |
| 46 | 1 | 5250000 | 40/80 | 30 | 5250000 | 750000 | 106 | 5234880 | 9051 | 9051 | 9072 |
| 47 | 1 | 5250000 | 40/80 | 30 | 5250180 | 750012 | 105 | 5234880 | 9051 | 9051 | 9072 |
| 48 | 1 | 5270000 | 40/80 | 30 | 5269980 | 751332 | 105 | 5255040 | 9065 | 9065 | 9086 |
| 49 | 1 | 5290000 | 40/80 | 30 | 5290140 | 752676 | 105 | 5275200 | 9079 | 9079 | 9100 |
| 50 | 1 | 5310000 | 40/80 | 30 | 5309940 | 753996 | 105 | 5295360 | 9093 | 9093 | 9113 |
| 51 | 1 | 5330000 | 40/80 | 30 | 5330100 | 755340 | 105 | 5315520 | 9107 | 9107 | 9127 |
| 52 | 2 | 5490000 | 40/80 | 30 | 5489940 | 765996 | 105 | 5475360 | 9218 | 9218 | 9238 |
| 53 | 2 | 5510000 | 40/80 | 30 | 5510100 | 767340 | 105 | 5495520 | 9232 | 9232 | 9252 |
| 54 | 2 | 5530000 | 40/80 | 30 | 5529900 | 768660 | 105 | 5515680 | 9246 | 9246 | 9266 |
| 55 | 2 | 5550000 | 40/80 | 30 | 5550060 | 770004 | 105 | 5535840 | 9260 | 9260 | 9280 |
| 56 | 2 | 5570000 | 40/80 | 30 | 5569860 | 771324 | 105 | 5554560 | 9273 | 9273 | 9294 |
| 57 | 2 | 5590000 | 40/80 | 30 | 5590020 | 772668 | 105 | 5574720 | 9287 | 9287 | 9308 |
| 58 | 2 | 5610000 | 40/80 | 30 | 5609820 | 773988 | 105 | 5594880 | 9301 | 9301 | 9322 |
| 59 | 2 | 5610000 | 40/80 | 30 | 5610000 | 774000 | 106 | 5594880 | 9301 | 9301 | 9322 |
| 60 | 2 | 5610000 | 40/80 | 30 | 5610180 | 774012 | 105 | 5594880 | 9301 | 9301 | 9322 |
| 61 | 2 | 5630000 | 40/80 | 30 | 5629980 | 775332 | 105 | 5615040 | 9315 | 9315 | 9336 |
| 62 | 2 | 5650000 | 40/80 | 30 | 5650140 | 776676 | 105 | 5635200 | 9329 | 9329 | 9350 |
| 63 | 2 | 5670000 | 40/80 | 30 | 5669940 | 777996 | 105 | 5655360 | 9343 | 9343 | 9363 |
| 64 | 2 | 5690000 | 40/80 | 30 | 5690100 | 779340 | 105 | 5675520 | 9357 | 9357 | 9377 |
| 65 | 2 | 5710000 | 40/80 | 30 | 5709900 | 780660 | 105 | 5695680 | 9371 | 9371 | 9391 |
| 66 | 3 | 5755000 | 40/80 | 30 | 5754900 | 783660 | 105 | 5740320 | 9402 | 9402 | 9422 |
| 67 | 3 | 5775000 | 40/80 | 30 | 5775060 | 785004 | 105 | 5760480 | 9416 | 9416 | 9436 |
| 68 | 3 | 5795000 | 40/80 | 30 | 5794860 | 786324 | 105 | 5780640 | 9430 | 9430 | 9450 |
| 69 | 3 | 5815000 | 40/80 | 30 | 5815020 | 787668 | 105 | 5800800 | 9444 | 9444 | 9464 |
| 70 | 3 | 5835000 | 40/80 | 30 | 5834820 | 788988 | 105 | 5819520 | 9457 | 9457 | 9478 |
| 71 | 3 | 5835000 | 40/80 | 30 | 5835000 | 789000 | 106 | 5819520 | 9457 | 9457 | 9478 |
| 72 | 3 | 5835000 | 40/80 | 30 | 5835180 | 789012 | 105 | 5820960 | 9458 | 9458 | 9478 |
| 73 | 3 | 5855000 | 40/80 | 30 | 5854980 | 790332 | 105 | 5839680 | 9471 | 9471 | 9492 |
| 74 | 3 | 5875000 | 40/80 | 30 | 5875140 | 791676 | 105 | 5859840 | 9485 | 9485 | 9506 |
| 75 | 3 | 5895000 | 40/80 | 30 | 5894940 | 792996 | 105 | 5880000 | 9499 | 9499 | 9520 | k_SSB column provides the k_SSB parameter for the selected SSB raster entry and NR channel raster entry combination. The RB offset (left) and (right) columns provide the number of PRBs that are available to the left and right of the SSB. In the case of a 3 PB Offset left and 27 RB offset right, this means that there are 3 PRB of the lower frequency, followed by SSB (which is 20 PRBs), and followed by 27 PRBs at the higher frequency within the occupied channel bandwidth. In such a case, the Occ. Chn-Start, Occ. Chn-End columns represent the center frequency of the first subcarrier (i.e., the subcarrier with the lowest frequency) of the occupied channel bandwidth and last subcarrier (i.e., the subcarrier with the highest frequency) of the occupied channel bandwidth, respectively.

The Left and Right Guard columns represent the leftover guard bands outside the occupied channel bandwidth. The SSB Start and End columns represent the center frequency of the first subcarrier (i.e., the subcarrier with the lowest frequency) of the SSB and last subcarrier (i.e., the subcarrier with the highest frequency) of the SSB, respectively.

TABLE 9

| Entry No. | k_SSB | RB Offset (Left) | RB Offset (Right) | Occ. Chn-Start [kHz] | Occ. Chn-End [kHz] | Left Guard [kHz] | Right Guard [kHz] | SSB Start [kHz] | SSB End [kHz] |
|---|---|---|---|---|---|---|---|---|---|
| 1 | 0 | 3 | 27 | 5151000 | 5168970 | 985 | 1015 | 5152080 | 5159250 |
| 2 | 0 | 3 | 27 | 5171160 | 5189130 | 1145 | 855 | 5172240 | 5179410 |
| 3 | 0 | 0 | 30 | 5190960 | 5208930 | 945 | 1055 | 5190960 | 5198130 |
| 4 | 0 | 0 | 30 | 5211120 | 5229090 | 1105 | 895 | 5211120 | 5218290 |
| 5 | 0 | 1 | 29 | 5230920 | 5248890 | 905 | 1095 | 5231280 | 5238450 |
| 6 | 0 | 1 | 29 | 5251080 | 5269050 | 1065 | 935 | 5251440 | 5258610 |
| 7 | 0 | 2 | 28 | 5270880 | 5288850 | 865 | 1135 | 5271600 | 5278770 |
| 8 | 0 | 2 | 28 | 5291040 | 5309010 | 1025 | 975 | 5291760 | 5298930 |
| 9 | 0 | 3 | 27 | 5310840 | 5328810 | 825 | 1175 | 5311920 | 5319090 |
| 10 | 0 | 3 | 28 | 5310840 | 5329170 | 825 | 815 | 5311920 | 5319090 |
| 11 | 0 | 2 | 28 | 5311200 | 5329170 | 1185 | 815 | 5311920 | 5319090 |
| 12 | 0 | 3 | 27 | 5331000 | 5348970 | 985 | 1015 | 5332080 | 5339250 |
| 13 | 0 | 2 | 28 | 5471040 | 5489010 | 1025 | 975 | 5471760 | 5478930 |
| 14 | 0 | 3 | 27 | 5490840 | 5508810 | 825 | 1175 | 5491920 | 5499090 |
| 15 | 0 | 3 | 28 | 5490840 | 5509170 | 825 | 815 | 5491920 | 5499090 |
| 16 | 0 | 2 | 28 | 5491200 | 5509170 | 1185 | 815 | 5491920 | 5499090 |

TABLE 9-continued

| Entry No. | k_SSB | RB Offset (Left) | RB Offset (Right) | Occ. Chn-Start [kHz] | Occ. Chn-End [kHz] | Left Guard [kHz] | Right Guard [kHz] | SSB Start [kHz] | SSB End [kHz] |
|---|---|---|---|---|---|---|---|---|---|
| 17 | 0 | 3 | 27 | 5511000 | 5528970 | 985 | 1015 | 5512080 | 5519250 |
| 18 | 0 | 3 | 27 | 5531160 | 5549130 | 1145 | 855 | 5532240 | 5539410 |
| 19 | 0 | 0 | 30 | 5550960 | 5568930 | 945 | 1055 | 5550960 | 5558130 |
| 20 | 0 | 0 | 30 | 5571120 | 5589090 | 1105 | 895 | 5571120 | 5578290 |
| 21 | 0 | 1 | 29 | 5590920 | 5608890 | 905 | 1095 | 5591280 | 5598450 |
| 22 | 0 | 1 | 29 | 5611080 | 5629050 | 1065 | 935 | 5611440 | 5618610 |
| 23 | 0 | 2 | 28 | 5630880 | 5648850 | 865 | 1135 | 5631600 | 5638770 |
| 24 | 0 | 2 | 28 | 5651040 | 5669010 | 1025 | 975 | 5651760 | 5658930 |
| 25 | 0 | 3 | 27 | 5670840 | 5688810 | 825 | 1175 | 5671920 | 5679090 |
| 26 | 0 | 3 | 28 | 5670840 | 5689190 | 825 | 815 | 5671920 | 5679090 |
| 27 | 0 | 2 | 28 | 5671200 | 5689170 | 1185 | 815 | 5671920 | 5679090 |
| 28 | 0 | 3 | 27 | 5691000 | 5708970 | 985 | 1015 | 5692080 | 5699250 |
| 29 | 0 | 3 | 27 | 5711160 | 5729130 | 1145 | 855 | 5712240 | 5719410 |
| 30 | 0 | 2 | 28 | 5736000 | 5753970 | 985 | 1015 | 5736720 | 5743890 |
| 31 | 0 | 2 | 28 | 5756160 | 5774130 | 1145 | 855 | 5756880 | 5764050 |
| 32 | 0 | 3 | 27 | 5775960 | 5793930 | 945 | 1055 | 5777040 | 5784210 |
| 33 | 0 | 3 | 27 | 5796120 | 5814090 | 1105 | 895 | 5797200 | 5804370 |
| 34 | 0 | 0 | 30 | 5815920 | 5833890 | 905 | 1095 | 5815920 | 5823090 |
| 35 | 0 | 0 | 30 | 5836080 | 5854050 | 1065 | 935 | 5836080 | 5843250 |
| 36 | 0 | 1 | 29 | 5855880 | 5873850 | 865 | 1135 | 5856240 | 5863410 |
| 37 | 0 | 1 | 29 | 5876040 | 5894010 | 1025 | 975 | 5876400 | 5883570 |
| 38 | 0 | 2 | 28 | 5895840 | 5913810 | 825 | 1175 | 5896560 | 5903730 |
| 39 | 0 | 2 | 29 | 5895840 | 5914170 | 825 | 815 | 5896560 | 5903730 |
| 40 | 0 | 1 | 29 | 5896200 | 5914170 | 1185 | 815 | 5896560 | 5903730 |
| 41 | 0 | 3 | 82 | 5151000 | 5188770 | 985 | 1215 | 5152080 | 5159250 |
| 42 | 0 | 3 | 82 | 5171160 | 5208930 | 1145 | 1055 | 5172240 | 5179410 |
| 43 | 0 | 0 | 85 | 5190960 | 5228730 | 945 | 1255 | 5190960 | 5198130 |
| 44 | 0 | 0 | 85 | 5211120 | 5248890 | 1105 | 1095 | 5211120 | 5218290 |
| 45 | 0 | 1 | 84 | 5230920 | 5268690 | 905 | 1295 | 5231280 | 5238450 |
| 46 | 0 | 1 | 85 | 5230920 | 5269050 | 905 | 935 | 5231280 | 5238450 |
| 47 | 0 | 0 | 85 | 5231280 | 5269050 | 1265 | 935 | 5231280 | 5238450 |
| 48 | 0 | 1 | 84 | 5251080 | 5288850 | 1065 | 1135 | 5251440 | 5258610 |
| 49 | 0 | 1 | 84 | 5271240 | 5309010 | 1225 | 975 | 5271600 | 5278770 |
| 50 | 0 | 2 | 83 | 5291040 | 5328810 | 1025 | 1175 | 5291760 | 5298930 |
| 51 | 0 | 2 | 83 | 5311200 | 5348970 | 1185 | 1015 | 5311920 | 5319090 |
| 52 | 0 | 2 | 83 | 5471040 | 5508810 | 1025 | 1175 | 5471760 | 5478930 |
| 53 | 0 | 2 | 83 | 5491200 | 5528970 | 1185 | 1015 | 5491920 | 5499090 |
| 54 | 0 | 3 | 82 | 5511000 | 5548770 | 985 | 1215 | 5512080 | 5519250 |
| 55 | 0 | 3 | 82 | 5531160 | 5568930 | 1145 | 1055 | 5532240 | 5539410 |
| 56 | 0 | 0 | 85 | 5550960 | 5588730 | 945 | 1255 | 5550960 | 5558130 |
| 57 | 0 | 0 | 85 | 5571120 | 5608890 | 1105 | 1095 | 5571120 | 5578290 |
| 58 | 0 | 1 | 84 | 5590920 | 5628690 | 905 | 1295 | 5591280 | 5598450 |
| 59 | 0 | 1 | 85 | 5590920 | 5629050 | 905 | 935 | 5591280 | 5598450 |
| 60 | 0 | 0 | 85 | 5591280 | 5629050 | 1265 | 935 | 5591280 | 5598450 |
| 61 | 0 | 1 | 84 | 5611080 | 5648850 | 1065 | 1135 | 5611440 | 5618610 |
| 62 | 0 | 1 | 84 | 5631240 | 5669010 | 1225 | 975 | 5631600 | 5638770 |
| 63 | 0 | 2 | 83 | 5651040 | 5688810 | 1025 | 1175 | 5651760 | 5658930 |
| 64 | 0 | 2 | 83 | 5671200 | 5708970 | 1185 | 1015 | 5671920 | 5679090 |
| 65 | 0 | 3 | 82 | 5691000 | 5728770 | 985 | 1215 | 5692080 | 5699250 |
| 66 | 0 | 2 | 83 | 5736000 | 5773770 | 985 | 1215 | 5736720 | 5743890 |
| 67 | 0 | 2 | 83 | 5756160 | 5793930 | 1145 | 1055 | 5756880 | 5764050 |
| 68 | 0 | 3 | 82 | 5775960 | 5813730 | 945 | 1255 | 5777040 | 5784210 |
| 69 | 0 | 3 | 82 | 5796120 | 5833890 | 1105 | 1095 | 5797200 | 5804370 |
| 70 | 0 | 0 | 85 | 5815920 | 5853690 | 905 | 1295 | 5815920 | 5823090 |
| 71 | 0 | 0 | 86 | 5815920 | 5854050 | 905 | 935 | 5815920 | 5823090 |
| 72 | 0 | 3 | 82 | 5816280 | 5854050 | 1265 | 935 | 5817360 | 5824530 |
| 73 | 0 | 0 | 85 | 5836080 | 5873850 | 1065 | 1135 | 5836080 | 5843250 |
| 74 | 0 | 0 | 85 | 5856240 | 5894010 | 1225 | 975 | 5856240 | 5863410 |
| 75 | 0 | 1 | 84 | 5876040 | 5913810 | 1025 | 1175 | 5876400 | 5883570 |

Example Set of Channel Raster & SSB Raster Entries for 15 kHz

Table 10 and Table 11 are one example of channel and SSB raster entries for 15 kHz.

TABLE 10

| Entry No. | UNII-Band | LTE Chn Raster [kHz] | BW [MHz] | Data SCS [kHz] | NR Chn Raster [kHz] | NR-ARFCN ($N_{REF}$) | N_PRB | SS Raster [kHz] | GSCN | Min GSCN | Max GSCN |
|---|---|---|---|---|---|---|---|---|---|---|---|
| 101 | 1 | 5160000 | 20/60/100 | 15 | 5160000 | 744000 | 104 | 5154240 | 8995 | 8995 | 9003 |
| 102 | 1 | 5160000 | 20/60/100 | 15 | 5160090 | 744006 | 105 | 5154240 | 8995 | 8995 | 9003 |
| 103 | 1 | 5180000 | 20/60/100 | 15 | 5180160 | 745344 | 104 | 5174400 | 9009 | 9009 | 9017 |
| 104 | 1 | 5200000 | 20/60/100 | 15 | 5199960 | 746664 | 104 | 5194560 | 9023 | 9023 | 9030 |
| 105 | 1 | 5200000 | 20/60/100 | 15 | 5200050 | 746670 | 105 | 5194560 | 9023 | 9023 | 9030 |

TABLE 10-continued

| Entry No. | UNII-Band | LTE Chn Raster [kHz] | BW [MHz] | Data SCS [kHz] | NR Chn Raster [kHz] | NR-ARFCN (N_REF) | N_PRB | SS Raster [kHz] | GSCN | Min GSCN | Max GSCN |
|---|---|---|---|---|---|---|---|---|---|---|---|
| 106 | 1 | 5220000 | 20/60/100 | 15 | 5220120 | 748008 | 104 | 5214720 | 9037 | 9037 | 9044 |
| 107 | 1 | 5240000 | 20/60/100 | 15 | 5239920 | 749328 | 104 | 5234880 | 9051 | 9051 | 9058 |
| 108 | 1 | 5240000 | 20/60/100 | 15 | 5240010 | 749334 | 105 | 5234880 | 9051 | 9051 | 9058 |
| 109 | 1 | 5260000 | 20/60/100 | 15 | 5260080 | 750672 | 104 | 5255040 | 9065 | 9065 | 9072 |
| 110 | 1 | 5280000 | 20/60/100 | 15 | 5279880 | 751992 | 104 | 5275200 | 9079 | 9079 | 9086 |
| 111 | 1 | 5280000 | 20/60/100 | 15 | 5279970 | 751998 | 105 | 5275200 | 9079 | 9079 | 9086 |
| 112 | 1 | 5300000 | 20/60/100 | 15 | 5300040 | 753336 | 104 | 5295360 | 9093 | 9093 | 9100 |
| 113 | 1 | 5320000 | 20/60/100 | 15 | 5319840 | 754656 | 104 | 5314080 | 9106 | 9106 | 9114 |
| 114 | 1 | 5320000 | 20/60/100 | 15 | 5319930 | 754662 | 105 | 5314080 | 9106 | 9106 | 9114 |
| 115 | 1 | 5340000 | 20/60/100 | 15 | 5340000 | 756000 | 104 | 5334240 | 9120 | 9120 | 9128 |
| 116 | 1 | 5340000 | 20/60/100 | 15 | 5340090 | 756006 | 105 | 5334240 | 9120 | 9120 | 9128 |
| 117 | 2 | 5480000 | 20/60/100 | 15 | 5480040 | 765336 | 104 | 5475360 | 9218 | 9218 | 9225 |
| 118 | 2 | 5500000 | 20/60/100 | 15 | 5499840 | 766656 | 104 | 5494080 | 9231 | 9231 | 9239 |
| 119 | 2 | 5500000 | 20/60/100 | 15 | 5499930 | 766662 | 105 | 5494080 | 9231 | 9231 | 9239 |
| 120 | 2 | 5520000 | 20/60/100 | 15 | 5520000 | 768000 | 104 | 5514240 | 9245 | 9245 | 9253 |
| 121 | 2 | 5520000 | 20/60/100 | 15 | 5520090 | 768006 | 105 | 5514240 | 9245 | 9245 | 9253 |
| 122 | 2 | 5540000 | 20/60/100 | 15 | 5540160 | 769344 | 104 | 5534400 | 9259 | 9259 | 9267 |
| 123 | 2 | 5560000 | 20/60/100 | 15 | 5559960 | 770664 | 104 | 5554560 | 9273 | 9273 | 9280 |
| 124 | 2 | 5560000 | 20/60/100 | 15 | 5560050 | 770670 | 105 | 5554560 | 9273 | 9273 | 9280 |
| 125 | 2 | 5580000 | 20/60/100 | 15 | 5580120 | 772008 | 104 | 5574720 | 9287 | 9287 | 9294 |
| 126 | 2 | 5600000 | 20/60/100 | 15 | 5599920 | 773328 | 104 | 5594880 | 9301 | 9301 | 9308 |
| 127 | 2 | 5600000 | 20/60/100 | 15 | 5600010 | 773334 | 105 | 5594880 | 9301 | 9301 | 9308 |
| 128 | 2 | 5620000 | 20/60/100 | 15 | 5620080 | 774672 | 104 | 5615040 | 9315 | 9315 | 9322 |
| 129 | 2 | 5640000 | 20/60/100 | 15 | 5639880 | 775992 | 104 | 5635200 | 9329 | 9329 | 9336 |
| 130 | 2 | 5640000 | 20/60/100 | 15 | 5639970 | 775998 | 105 | 5635200 | 9329 | 9329 | 9336 |
| 131 | 2 | 5660000 | 20/60/100 | 15 | 5660040 | 777336 | 104 | 5655360 | 9343 | 9343 | 9350 |
| 132 | 2 | 5680000 | 20/60/100 | 15 | 5679840 | 778656 | 104 | 5674080 | 9356 | 9356 | 9364 |
| 133 | 2 | 5680000 | 20/60/100 | 15 | 5679930 | 778662 | 105 | 5674080 | 9356 | 9356 | 9364 |
| 134 | 2 | 5700000 | 20/60/100 | 15 | 5700000 | 780000 | 104 | 5694240 | 9370 | 9370 | 9378 |
| 135 | 2 | 5700000 | 20/60/100 | 15 | 5700090 | 780006 | 105 | 5694240 | 9370 | 9370 | 9378 |
| 136 | 2 | 5720000 | 20/60/100 | 15 | 5720160 | 781344 | 104 | 5714400 | 9384 | 9384 | 9392 |
| 137 | 3 | 5745000 | 20/60/100 | 15 | 5745000 | 783000 | 104 | 5740320 | 9402 | 9402 | 9409 |
| 138 | 3 | 5745000 | 20/60/100 | 15 | 5745090 | 783006 | 105 | 5740320 | 9402 | 9402 | 9409 |
| 139 | 3 | 5765000 | 20/60/100 | 15 | 5765160 | 784344 | 104 | 5760480 | 9416 | 9416 | 9423 |
| 140 | 3 | 5785000 | 20/60/100 | 15 | 5784960 | 785664 | 104 | 5779200 | 9429 | 9429 | 9437 |
| 141 | 3 | 5785000 | 20/60/100 | 15 | 5785050 | 785670 | 105 | 5779200 | 9429 | 9429 | 9437 |
| 142 | 3 | 5805000 | 20/60/100 | 15 | 5805120 | 787008 | 104 | 5799360 | 9443 | 9443 | 9451 |
| 143 | 3 | 5825000 | 20/60/100 | 15 | 5824920 | 788328 | 104 | 5819520 | 9457 | 9457 | 9464 |
| 144 | 3 | 5825000 | 20/60/100 | 15 | 5825010 | 788334 | 105 | 5819520 | 9457 | 9457 | 9464 |
| 145 | 3 | 5845000 | 20/60/100 | 15 | 5845080 | 789672 | 104 | 5839680 | 9471 | 9471 | 9478 |
| 146 | 3 | 5865000 | 20/60/100 | 15 | 5864880 | 790992 | 104 | 5859840 | 9485 | 9485 | 9492 |
| 147 | 3 | 5865000 | 20/60/100 | 15 | 5864970 | 790998 | 105 | 5859840 | 9485 | 9485 | 9492 |
| 148 | 3 | 5885000 | 20/60/100 | 15 | 5885040 | 792336 | 104 | 5880000 | 9499 | 9499 | 9506 |
| 149 | 3 | 5905000 | 20/60/100 | 15 | 5904840 | 793656 | 104 | 5900160 | 9513 | 9513 | 9520 |
| 150 | 3 | 5905000 | 20/60/100 | 15 | 5904930 | 793662 | 105 | 5900160 | 9513 | 9513 | 9520 |
| 151 | 1 | 5170000 | 40/80 | 15 | 5169900 | 744660 | 214 | 5154240 | 8995 | 8995 | 9016 |
| 152 | 1 | 5170000 | 40/80 | 15 | 5169990 | 744666 | 215 | 5154240 | 8995 | 8995 | 9016 |
| 153 | 1 | 5190000 | 40/80 | 15 | 5190060 | 746004 | 214 | 5174400 | 9009 | 9009 | 9030 |
| 154 | 1 | 5210000 | 40/80 | 15 | 5209860 | 747324 | 214 | 5194560 | 9023 | 9023 | 9044 |
| 155 | 1 | 5210000 | 40/80 | 15 | 5209950 | 747330 | 215 | 5194560 | 9023 | 9023 | 9044 |
| 156 | 1 | 5230000 | 40/80 | 15 | 5230020 | 748668 | 214 | 5214720 | 9037 | 9037 | 9058 |
| 157 | 1 | 5250000 | 40/80 | 15 | 5249820 | 749988 | 214 | 5234880 | 9051 | 9051 | 9072 |
| 158 | 1 | 5250000 | 40/80 | 15 | 5249910 | 749994 | 215 | 5234880 | 9051 | 9051 | 9072 |
| 159 | 1 | 5250000 | 40/80 | 15 | 5250000 | 750000 | 216 | 5234880 | 9051 | 9051 | 9072 |
| 160 | 1 | 5250000 | 40/80 | 15 | 5250180 | 750012 | 214 | 5234880 | 9051 | 9051 | 9072 |
| 161 | 1 | 5270000 | 40/80 | 15 | 5269980 | 751332 | 214 | 5255040 | 9065 | 9065 | 9086 |
| 162 | 1 | 5270000 | 40/80 | 15 | 5270070 | 751338 | 215 | 5255040 | 9065 | 9065 | 9086 |
| 163 | 1 | 5290000 | 40/80 | 15 | 5290140 | 752676 | 214 | 5275200 | 9079 | 9079 | 9100 |
| 164 | 1 | 5310000 | 40/80 | 15 | 5309940 | 753996 | 214 | 5295360 | 9093 | 9093 | 9114 |
| 165 | 1 | 5310000 | 40/80 | 15 | 5310030 | 754002 | 215 | 5295360 | 9093 | 9093 | 9114 |
| 166 | 1 | 5330000 | 40/80 | 15 | 5330100 | 755340 | 214 | 5315520 | 9107 | 9107 | 9128 |
| 167 | 2 | 5490000 | 40/80 | 15 | 5489940 | 765996 | 214 | 5475360 | 9218 | 9218 | 9239 |
| 168 | 2 | 5490000 | 40/80 | 15 | 5490030 | 766002 | 215 | 5475360 | 9218 | 9218 | 9239 |
| 169 | 2 | 5510000 | 40/80 | 15 | 5510100 | 767340 | 214 | 5495520 | 9232 | 9232 | 9253 |
| 170 | 2 | 5530000 | 40/80 | 15 | 5529900 | 768660 | 214 | 5514240 | 9245 | 9245 | 9266 |
| 171 | 2 | 5530000 | 40/80 | 15 | 5529990 | 768666 | 215 | 5514240 | 9245 | 9245 | 9266 |
| 172 | 2 | 5550000 | 40/80 | 15 | 5550060 | 770004 | 214 | 5534400 | 9259 | 9259 | 9280 |
| 173 | 2 | 5570000 | 40/80 | 15 | 5569860 | 771324 | 214 | 5554560 | 9273 | 9273 | 9294 |
| 174 | 2 | 5570000 | 40/80 | 15 | 5569950 | 771330 | 215 | 5554560 | 9273 | 9273 | 9294 |
| 175 | 2 | 5590000 | 40/80 | 15 | 5590020 | 772668 | 214 | 5574720 | 9287 | 9287 | 9308 |
| 176 | 2 | 5610000 | 40/80 | 15 | 5609820 | 773988 | 214 | 5594880 | 9301 | 9301 | 9322 |
| 177 | 2 | 5610000 | 40/80 | 15 | 5609910 | 773994 | 215 | 5594880 | 9301 | 9301 | 9322 |
| 178 | 2 | 5610000 | 40/80 | 15 | 5610000 | 774000 | 216 | 5594880 | 9301 | 9301 | 9322 |
| 179 | 2 | 5610000 | 40/80 | 15 | 5610180 | 774012 | 214 | 5594880 | 9301 | 9301 | 9322 |
| 180 | 2 | 5630000 | 40/80 | 15 | 5629980 | 775332 | 214 | 5615040 | 9315 | 9315 | 9336 |
| 181 | 2 | 5630000 | 40/80 | 15 | 5630070 | 775338 | 215 | 5615040 | 9315 | 9315 | 9336 |

TABLE 10-continued

| Entry No. | UNII-Band | LTE Chn Raster [kHz] | BW [MHz] | Data SCS [kHz] | NR Chn Raster [kHz] | NR-ARFCN (N_REF) | N_PRB | SS Raster [kHz] | GSCN | Min GSCN | Max GSCN |
|---|---|---|---|---|---|---|---|---|---|---|---|
| 182 | 2 | 5650000 | 40/80 | 15 | 5650140 | 776676 | 214 | 5635200 | 9329 | 9329 | 9350 |
| 183 | 2 | 5670000 | 40/80 | 15 | 5669940 | 777996 | 214 | 5655360 | 9343 | 9343 | 9364 |
| 184 | 2 | 5670000 | 40/80 | 15 | 5670030 | 778002 | 215 | 5655360 | 9343 | 9343 | 9364 |
| 185 | 2 | 5690000 | 40/80 | 15 | 5690100 | 779340 | 214 | 5675520 | 9357 | 9357 | 9378 |
| 186 | 2 | 5710000 | 40/80 | 15 | 5709900 | 780660 | 214 | 5694240 | 9370 | 9370 | 9391 |
| 187 | 2 | 5710000 | 40/80 | 15 | 5709990 | 780666 | 215 | 5694240 | 9370 | 9370 | 9391 |
| 188 | 3 | 5755000 | 40/80 | 15 | 5754900 | 783660 | 214 | 5740320 | 9402 | 9402 | 9423 |
| 189 | 3 | 5755000 | 40/80 | 15 | 5754990 | 783666 | 215 | 5740320 | 9402 | 9402 | 9423 |
| 190 | 3 | 5775000 | 40/80 | 15 | 5775060 | 785004 | 214 | 5760480 | 9416 | 9416 | 9437 |
| 191 | 3 | 5795000 | 40/80 | 15 | 5794860 | 786324 | 214 | 5779200 | 9429 | 9429 | 9450 |
| 192 | 3 | 5795000 | 40/80 | 15 | 5794950 | 786330 | 215 | 5779200 | 9429 | 9429 | 9450 |
| 193 | 3 | 5815000 | 40/80 | 15 | 5815020 | 787668 | 214 | 5799360 | 9443 | 9443 | 9464 |
| 194 | 3 | 5835000 | 40/80 | 15 | 5834820 | 788988 | 214 | 5819520 | 9457 | 9457 | 9478 |
| 195 | 3 | 5835000 | 40/80 | 15 | 5834910 | 788994 | 215 | 5819520 | 9457 | 9457 | 9478 |
| 196 | 3 | 5835000 | 40/80 | 15 | 5835000 | 789000 | 216 | 5819520 | 9457 | 9457 | 9478 |
| 197 | 3 | 5835000 | 40/80 | 15 | 5835180 | 789012 | 214 | 5819520 | 9457 | 9457 | 9478 |
| 198 | 3 | 5855000 | 40/80 | 15 | 5854980 | 790332 | 214 | 5839680 | 9471 | 9471 | 9492 |
| 199 | 3 | 5855000 | 40/80 | 15 | 5855070 | 790338 | 215 | 5839680 | 9471 | 9471 | 9492 |
| 200 | 3 | 5875000 | 40/80 | 15 | 5875140 | 791676 | 214 | 5859840 | 9485 | 9485 | 9506 |
| 201 | 3 | 5895000 | 40/80 | 15 | 5894940 | 792996 | 214 | 5880000 | 9499 | 9499 | 9520 |
| 202 | 3 | 5895000 | 40/80 | 15 | 5895030 | 793002 | 215 | 5880000 | 9499 | 9499 | 9520 |

TABLE 11

| Entry No. | k_SSB | RB Offset (Left) | RB Offset (Right) | Occ. Chn-Start [kHz] | Occ. Chn-End [kHz] | Left Guard [kHz] | Right Guard [kHz] | SSB Start [kHz] | SSB End [kHz] |
|---|---|---|---|---|---|---|---|---|---|
| 101 | 0 | 0 | 64 | 5150640 | 5169345 | 632.5 | 647.5 | 5150640 | 5157810 |
| 102 | 0 | 0 | 65 | 5150640 | 5169525 | 632.5 | 467.5 | 5150640 | 5157810 |
| 103 | 0 | 0 | 64 | 5170800 | 5189505 | 792.5 | 487.5 | 5170800 | 5177970 |
| 104 | 0 | 2 | 62 | 5190600 | 5209305 | 592.5 | 687.5 | 5190960 | 5198130 |
| 105 | 0 | 2 | 63 | 5190600 | 5209485 | 592.5 | 507.5 | 5190960 | 5198130 |
| 106 | 0 | 2 | 62 | 5210760 | 5229465 | 752.5 | 527.5 | 5211120 | 5218290 |
| 107 | 0 | 4 | 60 | 5230560 | 5249265 | 552.5 | 727.5 | 5231280 | 5238450 |
| 108 | 0 | 4 | 61 | 5230560 | 5249445 | 552.5 | 547.5 | 5231280 | 5238450 |
| 109 | 0 | 4 | 60 | 5250720 | 5269425 | 712.5 | 567.5 | 5251440 | 5258610 |
| 110 | 0 | 6 | 58 | 5270520 | 5289225 | 512.5 | 767.5 | 5271600 | 5278770 |
| 111 | 0 | 6 | 59 | 5270520 | 5289405 | 512.5 | 587.5 | 5271600 | 5278770 |
| 112 | 0 | 6 | 58 | 5290680 | 5309385 | 672.5 | 607.5 | 5291760 | 5298930 |
| 113 | 0 | 0 | 64 | 5310480 | 5329185 | 472.5 | 807.5 | 5310480 | 5317650 |
| 114 | 0 | 0 | 65 | 5310480 | 5329365 | 472.5 | 627.5 | 5310480 | 5317650 |
| 115 | 0 | 0 | 64 | 5330640 | 5349345 | 632.5 | 647.5 | 5330640 | 5337810 |
| 116 | 0 | 0 | 65 | 5330640 | 5349525 | 632.5 | 467.5 | 5330640 | 5337810 |
| 117 | 0 | 6 | 58 | 5470680 | 5489385 | 672.5 | 607.5 | 5471760 | 5478930 |
| 118 | 0 | 0 | 64 | 5490480 | 5509185 | 472.5 | 807.5 | 5490480 | 5497650 |
| 119 | 0 | 0 | 65 | 5490480 | 5509365 | 472.5 | 627.5 | 5490480 | 5497650 |
| 120 | 0 | 0 | 64 | 5510640 | 5529345 | 632.5 | 647.5 | 5510640 | 5517810 |
| 121 | 0 | 0 | 65 | 5510640 | 5529525 | 632.5 | 467.5 | 5510640 | 5517810 |
| 122 | 0 | 0 | 64 | 5530800 | 5549505 | 792.5 | 487.5 | 5530800 | 5537970 |
| 123 | 0 | 2 | 62 | 5550600 | 5569305 | 592.5 | 687.5 | 5550960 | 5558130 |
| 124 | 0 | 2 | 63 | 5550600 | 5569485 | 592.5 | 507.5 | 5550960 | 5558130 |
| 125 | 0 | 2 | 62 | 5570760 | 5589465 | 752.5 | 527.5 | 5571120 | 5578290 |
| 126 | 0 | 4 | 60 | 5590560 | 5609265 | 552.5 | 727.5 | 5591280 | 5598450 |
| 127 | 0 | 4 | 61 | 5590560 | 5609445 | 552.5 | 547.5 | 5591280 | 5598450 |
| 128 | 0 | 4 | 60 | 5610720 | 5629425 | 712.5 | 567.5 | 5611440 | 5618610 |
| 129 | 0 | 6 | 58 | 5630520 | 5649225 | 512.5 | 767.5 | 5631600 | 5638770 |
| 130 | 0 | 6 | 59 | 5630520 | 5649405 | 512.5 | 587.5 | 5631600 | 5638770 |
| 131 | 0 | 6 | 58 | 5650680 | 5669385 | 672.5 | 607.5 | 5651760 | 5658930 |
| 132 | 0 | 0 | 64 | 5670480 | 5689185 | 472.5 | 807.5 | 5670480 | 5677650 |
| 133 | 0 | 0 | 65 | 5670480 | 5689365 | 472.5 | 627.5 | 5670480 | 5677650 |
| 134 | 0 | 0 | 64 | 5690640 | 5709345 | 632.5 | 647.5 | 5690640 | 5697810 |
| 135 | 0 | 0 | 65 | 5690640 | 5709525 | 632.5 | 467.5 | 5690640 | 5697810 |
| 136 | 0 | 0 | 64 | 5710800 | 5729505 | 792.5 | 487.5 | 5710800 | 5717970 |
| 137 | 0 | 6 | 58 | 5735640 | 5754345 | 632.5 | 647.5 | 5736720 | 5743890 |
| 138 | 0 | 6 | 59 | 5735640 | 5754525 | 632.5 | 467.5 | 5736720 | 5743890 |
| 139 | 0 | 6 | 58 | 5755800 | 5774505 | 792.5 | 487.5 | 5756880 | 5764050 |
| 140 | 0 | 0 | 64 | 5775600 | 5794305 | 592.5 | 687.5 | 5775600 | 5782770 |
| 141 | 0 | 0 | 65 | 5775600 | 5794485 | 592.5 | 507.5 | 5775600 | 5782770 |
| 142 | 0 | 0 | 64 | 5795760 | 5814465 | 752.5 | 527.5 | 5795760 | 5802930 |
| 143 | 0 | 2 | 62 | 5815560 | 5834265 | 552.5 | 727.5 | 5815920 | 5823090 |
| 144 | 0 | 2 | 63 | 5815560 | 5834445 | 552.5 | 547.5 | 5815920 | 5823090 |
| 145 | 0 | 2 | 62 | 5835720 | 5854425 | 712.5 | 567.5 | 5836080 | 5843250 |
| 146 | 0 | 4 | 60 | 5855520 | 5874225 | 512.5 | 767.5 | 5856240 | 5863410 |

TABLE 11-continued

| Entry No. | k_SSB | RB Offset (Left) | RB Offset (Right) | Occ. Chn-Start [kHz] | Occ. Chn-End [kHz] | Left Guard [kHz] | Right Guard [kHz] | SSB Start [kHz] | SSB End [kHz] |
|---|---|---|---|---|---|---|---|---|---|
| 147 | 0 | 4 | 61 | 5855520 | 5874405 | 512.5 | 587.5 | 5856240 | 5863410 |
| 148 | 0 | 4 | 60 | 5875680 | 5894385 | 672.5 | 607.5 | 5876400 | 5883570 |
| 149 | 0 | 6 | 58 | 5895480 | 5914185 | 472.5 | 807.5 | 5896560 | 5903730 |
| 150 | 0 | 6 | 59 | 5895480 | 5914365 | 472.5 | 627.5 | 5896560 | 5903730 |
| 151 | 0 | 0 | 174 | 5150640 | 5189145 | 632.5 | 847.5 | 5150640 | 5157810 |
| 152 | 0 | 0 | 175 | 5150640 | 5189325 | 632.5 | 667.5 | 5150640 | 5157810 |
| 153 | 0 | 0 | 174 | 5170800 | 5209305 | 792.5 | 687.5 | 5170800 | 5177970 |
| 154 | 0 | 2 | 172 | 5190600 | 5229105 | 592.5 | 887.5 | 5190960 | 5198130 |
| 155 | 0 | 2 | 173 | 5190600 | 5229285 | 592.5 | 707.5 | 5190960 | 5198130 |
| 156 | 0 | 2 | 172 | 5210760 | 5249265 | 752.5 | 727.5 | 5211120 | 5218290 |
| 157 | 0 | 4 | 170 | 5230560 | 5269065 | 552.5 | 927.5 | 5231280 | 5238450 |
| 158 | 0 | 4 | 171 | 5230560 | 5269245 | 552.5 | 747.5 | 5231280 | 5238450 |
| 159 | 0 | 4 | 172 | 5230560 | 5269425 | 552.5 | 567.5 | 5231280 | 5238450 |
| 160 | 0 | 2 | 172 | 5230920 | 5269425 | 912.5 | 567.5 | 5231280 | 5238450 |
| 161 | 0 | 4 | 170 | 5250720 | 5289225 | 712.5 | 767.5 | 5251440 | 5258610 |
| 162 | 0 | 4 | 171 | 5250720 | 5289405 | 712.5 | 587.5 | 5251440 | 5258610 |
| 163 | 0 | 4 | 170 | 5270880 | 5309385 | 872.5 | 607.5 | 5271600 | 5278770 |
| 164 | 0 | 6 | 168 | 5290680 | 5329185 | 672.5 | 807.5 | 5291760 | 5298930 |
| 165 | 0 | 6 | 169 | 5290680 | 5329365 | 672.5 | 627.5 | 5291760 | 5298930 |
| 166 | 0 | 6 | 168 | 5310840 | 5349345 | 832.5 | 647.5 | 5311920 | 5319090 |
| 167 | 0 | 6 | 168 | 5470680 | 5509185 | 672.5 | 807.5 | 5471760 | 5478930 |
| 168 | 0 | 6 | 169 | 5470680 | 5509365 | 672.5 | 627.5 | 5471760 | 5478930 |
| 169 | 0 | 6 | 168 | 5490840 | 5529345 | 832.5 | 647.5 | 5491920 | 5499090 |
| 170 | 0 | 0 | 174 | 5510640 | 5549145 | 632.5 | 847.5 | 5510640 | 5517810 |
| 171 | 0 | 0 | 175 | 5510640 | 5549325 | 632.5 | 667.5 | 5510640 | 5517810 |
| 172 | 0 | 0 | 174 | 5530800 | 5569305 | 792.5 | 687.5 | 5530800 | 5537970 |
| 173 | 0 | 2 | 172 | 5550600 | 5589105 | 592.5 | 887.5 | 5550960 | 5558130 |
| 174 | 0 | 2 | 173 | 5550600 | 5589285 | 592.5 | 707.5 | 5550960 | 5558130 |
| 175 | 0 | 2 | 172 | 5570760 | 5609265 | 752.5 | 727.5 | 5571120 | 5578290 |
| 176 | 0 | 4 | 170 | 5590560 | 5629065 | 552.5 | 927.5 | 5591280 | 5598450 |
| 177 | 0 | 4 | 171 | 5590560 | 5629245 | 552.5 | 747.5 | 5591280 | 5598450 |
| 178 | 0 | 4 | 172 | 5590560 | 5629425 | 552.5 | 567.5 | 5591280 | 5598450 |
| 179 | 0 | 2 | 172 | 5590920 | 5629425 | 912.5 | 567.5 | 5591280 | 5598450 |
| 180 | 0 | 4 | 170 | 5610720 | 5649225 | 712.5 | 767.5 | 5611440 | 5618610 |
| 181 | 0 | 4 | 171 | 5610720 | 5649405 | 712.5 | 587.5 | 5611440 | 5618610 |
| 182 | 0 | 4 | 170 | 5630880 | 5669385 | 872.5 | 607.5 | 5631600 | 5638770 |
| 183 | 0 | 6 | 168 | 5650680 | 5689185 | 672.5 | 807.5 | 5651760 | 5658930 |
| 184 | 0 | 6 | 169 | 5650680 | 5689365 | 672.5 | 627.5 | 5651760 | 5658930 |
| 185 | 0 | 6 | 168 | 5670840 | 5709345 | 832.5 | 647.5 | 5671920 | 5679090 |
| 186 | 0 | 0 | 174 | 5690640 | 5729145 | 632.5 | 847.5 | 5690640 | 5697810 |
| 187 | 0 | 0 | 175 | 5690640 | 5729325 | 632.5 | 667.5 | 5690640 | 5697810 |
| 188 | 0 | 6 | 168 | 5735640 | 5774145 | 632.5 | 847.5 | 5736720 | 5743890 |
| 189 | 0 | 6 | 169 | 5735640 | 5774325 | 632.5 | 667.5 | 5736720 | 5743890 |
| 190 | 0 | 6 | 168 | 5755800 | 5794305 | 792.5 | 687.5 | 5756880 | 5764050 |
| 191 | 0 | 0 | 174 | 5775600 | 5814105 | 592.5 | 887.5 | 5775600 | 5782770 |
| 192 | 0 | 0 | 175 | 5775600 | 5814285 | 592.5 | 707.5 | 5775600 | 5782770 |
| 193 | 0 | 0 | 174 | 5795760 | 5834265 | 752.5 | 727.5 | 5795760 | 5802930 |
| 194 | 0 | 2 | 172 | 5815560 | 5854065 | 552.5 | 927.5 | 5815920 | 5823090 |
| 195 | 0 | 2 | 173 | 5815560 | 5854245 | 552.5 | 747.5 | 5815920 | 5823090 |
| 196 | 0 | 2 | 174 | 5815560 | 5854425 | 552.5 | 567.5 | 5815920 | 5823090 |
| 197 | 0 | 0 | 174 | 5815920 | 5854425 | 912.5 | 567.5 | 5815920 | 5823090 |
| 198 | 0 | 2 | 172 | 5835720 | 5874225 | 712.5 | 767.5 | 5836080 | 5843250 |
| 199 | 0 | 2 | 173 | 5835720 | 5874405 | 712.5 | 587.5 | 5836080 | 5843250 |
| 200 | 0 | 2 | 172 | 5855880 | 5894385 | 872.5 | 607.5 | 5856240 | 5863410 |
| 201 | 0 | 4 | 170 | 5875680 | 5914185 | 672.5 | 807.5 | 5876400 | 5883570 |
| 202 | 0 | 4 | 171 | 5875680 | 5914365 | 672.5 | 627.5 | 5876400 | 5883570 |

Example Set of Channel Raster & SSB Raster Entries for 30 kHz & 15 kHz With 1 Unique Channel Raster Entry per LTE 20 MHz Channel In the example channel raster and SSB raster entries shown in Table 8, Table 9, Table 10, and Table 11, there may be multiple entries that correspond to the same LTE channel raster. To avoid the additional channel raster entries, further down selection may be performed to select NR channel raster entries that only support 50 PRB and choose only 1 NR channel entry per LTE channel raster entry for 20 MHz channels and only support 104 PRB or 106 PRB for 40 MHz channels.

Table 12 shows NR channel raster entries that could be applicable for both 30 kHz data subcarrier operation.

TABLE 12

| UNII-Band | LTE Chn Raster [kHz] | BW [MHz] | Data SCS [kHz] | NR Chn Raster [kHz] | NR-ARFCN ($N_{REF}$) | N_PRB | SS Raster [kHz] | GSCN | Min GSCN | Max GSCN |
|---|---|---|---|---|---|---|---|---|---|---|
| 1 | 5160000 | 20/60/100 | 30 | 5160000 | 744000 | 50 | 5155680 | 8996 | 8996 | 9002 |
| 1 | 5180000 | 20/60/100 | 30 | 5180160 | 745344 | 50 | 5175840 | 9010 | 9010 | 9016 |

TABLE 12-continued

| UNII-Band | LTE Chn Raster [kHz] | BW [MHz] | Data SCS [kHz] | NR Chn Raster [kHz] | NR-ARFCN ($N_{REF}$) | N_PRB | SS Raster [kHz] | GSCN | Min GSCN | Max GSCN |
|---|---|---|---|---|---|---|---|---|---|---|
| 1 | 5200000 | 20/60/100 | 30 | 5199960 | 746664 | 50 | 5194560 | 9023 | 9023 | 9030 |
| 1 | 5220000 | 20/60/100 | 30 | 5220120 | 748008 | 50 | 5214720 | 9037 | 9037 | 9044 |
| 1 | 5240000 | 20/60/100 | 30 | 5239920 | 749328 | 50 | 5234880 | 9051 | 9051 | 9058 |
| 1 | 5260000 | 20/60/100 | 30 | 5260080 | 750672 | 50 | 5255040 | 9065 | 9065 | 9072 |
| 1 | 5280000 | 20/60/100 | 30 | 5279880 | 751992 | 50 | 5275200 | 9079 | 9079 | 9086 |
| 1 | 5300000 | 20/60/100 | 30 | 5300040 | 753336 | 50 | 5295360 | 9093 | 9093 | 9100 |
| 1 | 5320000 | 20/60/100 | 30 | 5320200 | 754680 | 50 | 5315520 | 9107 | 9107 | 9114 |
| 1 | 5340000 | 20/60/100 | 30 | 5340000 | 756000 | 50 | 5335680 | 9121 | 9121 | 9127 |
| 2 | 5480000 | 20/60/100 | 30 | 5480040 | 765336 | 50 | 5475360 | 9218 | 9218 | 9225 |
| 2 | 5500000 | 20/60/100 | 30 | 5500200 | 766680 | 50 | 5495520 | 9232 | 9232 | 9239 |
| 2 | 5520000 | 20/60/100 | 30 | 5520000 | 768000 | 50 | 5515680 | 9246 | 9246 | 9252 |
| 2 | 5540000 | 20/60/100 | 30 | 5540160 | 769344 | 50 | 5535840 | 9260 | 9260 | 9266 |
| 2 | 5560000 | 20/60/100 | 30 | 5559960 | 770664 | 50 | 5554560 | 9273 | 9273 | 9280 |
| 2 | 5580000 | 20/60/100 | 30 | 5580120 | 772008 | 50 | 5574720 | 9287 | 9287 | 9294 |
| 2 | 5600000 | 20/60/100 | 30 | 5599920 | 773328 | 50 | 5594880 | 9301 | 9301 | 9308 |
| 2 | 5620000 | 20/60/100 | 30 | 5620080 | 774672 | 50 | 5615040 | 9315 | 9315 | 9322 |
| 2 | 5640000 | 20/60/100 | 30 | 5639880 | 775992 | 50 | 5635200 | 9329 | 9329 | 9336 |
| 2 | 5660000 | 20/60/100 | 30 | 5660040 | 777336 | 50 | 5655360 | 9343 | 9343 | 9350 |
| 2 | 5680000 | 20/60/100 | 30 | 5680200 | 778680 | 50 | 5675520 | 9357 | 9357 | 9364 |
| 2 | 5700000 | 20/60/100 | 30 | 5700000 | 780000 | 50 | 5695680 | 9371 | 9371 | 9377 |
| 2 | 5720000 | 20/60/100 | 30 | 5720160 | 781344 | 50 | 5715840 | 9385 | 9385 | 9391 |
| 3 | 5745000 | 20/60/100 | 30 | 5745000 | 783000 | 50 | 5740320 | 9402 | 9402 | 9409 |
| 3 | 5765000 | 20/60/100 | 30 | 5765160 | 784344 | 50 | 5760480 | 9416 | 9416 | 9423 |
| 3 | 5785000 | 20/60/100 | 30 | 5784960 | 785664 | 50 | 5780640 | 9430 | 9430 | 9436 |
| 3 | 5805000 | 20/60/100 | 30 | 5805120 | 787008 | 50 | 5800800 | 9444 | 9444 | 9450 |
| 3 | 5825000 | 20/60/100 | 30 | 5824920 | 788328 | 50 | 5819520 | 9457 | 9457 | 9464 |
| 3 | 5845000 | 20/60/100 | 30 | 5845080 | 789672 | 50 | 5839680 | 9471 | 9471 | 9478 |
| 3 | 5865000 | 20/60/100 | 30 | 5864880 | 790992 | 50 | 5859840 | 9485 | 9485 | 9492 |
| 3 | 5885000 | 20/60/100 | 30 | 5885040 | 792336 | 50 | 5880000 | 9499 | 9499 | 9506 |
| 3 | 5905000 | 20/60/100 | 30 | 5905200 | 793680 | 50 | 5900160 | 9513 | 9513 | 9520 |
| 1 | 5170000 | 40/80 | 30 | 5169900 | 744660 | 105 | 5155680 | 8996 | 8996 | 9016 |
| 1 | 5190000 | 40/80 | 30 | 5190060 | 746004 | 105 | 5175840 | 9010 | 9010 | 9030 |
| 1 | 5210000 | 40/80 | 30 | 5209860 | 747324 | 105 | 5194560 | 9023 | 9023 | 9044 |
| 1 | 5230000 | 40/80 | 30 | 5230020 | 748668 | 105 | 5214720 | 9037 | 9037 | 9058 |
| 1 | 5250000 | 40/80 | 30 | 5250000 | 750000 | 106 | 5234880 | 9051 | 9051 | 9072 |
| 1 | 5270000 | 40/80 | 30 | 5269980 | 751332 | 105 | 5255040 | 9065 | 9065 | 9086 |
| 1 | 5290000 | 40/80 | 30 | 5290140 | 752676 | 105 | 5275200 | 9079 | 9079 | 9100 |
| 1 | 5310000 | 40/80 | 30 | 5309940 | 753996 | 105 | 5295360 | 9093 | 9093 | 9113 |
| 1 | 5330000 | 40/80 | 30 | 5330100 | 755340 | 105 | 5315520 | 9107 | 9107 | 9127 |
| 2 | 5490000 | 40/80 | 30 | 5489940 | 765996 | 105 | 5475360 | 9218 | 9218 | 9238 |
| 2 | 5510000 | 40/80 | 30 | 5510100 | 767340 | 105 | 5495520 | 9232 | 9232 | 9252 |
| 2 | 5530000 | 40/80 | 30 | 5529900 | 768660 | 105 | 5515680 | 9246 | 9246 | 9266 |
| 2 | 5550000 | 40/80 | 30 | 5550060 | 770004 | 105 | 5535840 | 9260 | 9260 | 9280 |
| 2 | 5570000 | 40/80 | 30 | 5569860 | 771324 | 105 | 5554560 | 9273 | 9273 | 9294 |
| 2 | 5590000 | 40/80 | 30 | 5590020 | 772668 | 105 | 5574720 | 9287 | 9287 | 9308 |
| 2 | 5610000 | 40/80 | 30 | 5610000 | 774000 | 106 | 5594880 | 9301 | 9301 | 9322 |
| 2 | 5630000 | 40/80 | 30 | 5629980 | 775332 | 105 | 5615040 | 9315 | 9315 | 9336 |
| 2 | 5650000 | 40/80 | 30 | 5650140 | 776676 | 105 | 5635200 | 9329 | 9329 | 9350 |
| 2 | 5670000 | 40/80 | 30 | 5669940 | 777996 | 105 | 5655360 | 9343 | 9343 | 9363 |
| 2 | 5690000 | 40/80 | 30 | 5690100 | 779340 | 105 | 5675520 | 9357 | 9357 | 9377 |
| 2 | 5710000 | 40/80 | 30 | 5709900 | 780660 | 105 | 5695680 | 9371 | 9371 | 9391 |
| 3 | 5755000 | 40/80 | 30 | 5754900 | 783660 | 105 | 5740320 | 9402 | 9402 | 9422 |
| 3 | 5775000 | 40/80 | 30 | 5775060 | 785004 | 105 | 5760480 | 9416 | 9416 | 9436 |
| 3 | 5795000 | 40/80 | 30 | 5794860 | 786324 | 105 | 5780640 | 9430 | 9430 | 9450 |
| 3 | 5815000 | 40/80 | 30 | 5815020 | 787668 | 105 | 5800800 | 9444 | 9444 | 9464 |
| 3 | 5835000 | 40/80 | 30 | 5835000 | 789000 | 106 | 5819520 | 9457 | 9457 | 9478 |
| 3 | 5855000 | 40/80 | 30 | 5854980 | 790332 | 105 | 5839680 | 9471 | 9471 | 9492 |
| 3 | 5875000 | 40/80 | 30 | 5875140 | 791676 | 105 | 5859840 | 9485 | 9485 | 9506 |
| 3 | 5895000 | 40/80 | 30 | 5894940 | 792996 | 105 | 5880000 | 9499 | 9499 | 9520 |

Example Set of Channel Raster & SSB Raster Entries for 30 kHz & 15 kHz With 1 Unique Channel Raster Entry per LTE 20 MHz Channel That Results in Identical Channel Raster Entry Between 30 kHz and 15 kHz In the example channel raster and SSB raster entries shown in Table 8, Table 9, Table 10, and Table 11, there may be multiple entries that could correspond to the same LTE channel raster. To avoid the additional channel raster entries, further down selection may be performed to select NR channel raster entries that only support 50 PRB and choose only 1 NR channel entry per LTE channel raster entry for 20 MHz channels, and only support 104 or 106 PRB for 40 Mhz channels. Additionally, the NR channel raster entries that are common for both 15 kHz and 30 kHz can be selected.

Table 13 and Table 14 show NR channel raster entries that could be applicable for both 30 kHz and 15 kHz data subcarrier operation. This compacts the total number of channel entries across all data subcarriers. The NR channel raster entries of Table 13 and Table 14 should be identical. However, the supported GSCN ranges for each channel raster entry might be slightly different. To support both 30 kHz and 15 kHz, the GSCN should be selected such that the same GSCN can support both 30 kHz and 15 kHz data subcarrier operations.

TABLE 13

| UNII-Band | LTE Chn Raster [kHz] | BW [MHz] | Data SCS [kHz] | NR Chn Raster [kHz] | NR-ARFCN ($N_{REF}$) | N_PRB | SS Raster [kHz] | GSCN | Min GSCN | Max GSCN |
|---|---|---|---|---|---|---|---|---|---|---|
| 1 | 5160000 | 20/60/100 | 30 | 5160000 | 744000 | 50 | 5155680 | 8996 | 8996 | 9002 |
| 1 | 5180000 | 20/60/100 | 30 | 5180160 | 745344 | 50 | 5175840 | 9010 | 9010 | 9016 |
| 1 | 5200000 | 20/60/100 | 30 | 5199960 | 746664 | 50 | 5194560 | 9023 | 9023 | 9030 |
| 1 | 5220000 | 20/60/100 | 30 | 5220120 | 748008 | 50 | 5214720 | 9037 | 9037 | 9044 |
| 1 | 5240000 | 20/60/100 | 30 | 5239920 | 749328 | 50 | 5234880 | 9051 | 9051 | 9058 |
| 1 | 5260000 | 20/60/100 | 30 | 5260080 | 750672 | 50 | 5255040 | 9065 | 9065 | 9072 |
| 1 | 5280000 | 20/60/100 | 30 | 5279880 | 751992 | 50 | 5275200 | 9079 | 9079 | 9086 |
| 1 | 5300000 | 20/60/100 | 30 | 5300040 | 753336 | 50 | 5295360 | 9093 | 9093 | 9100 |
| 1 | 5320000 | 20/60/100 | 30 | 5319840 | 754656 | 50 | 5315520 | 9107 | 9107 | 9113 |
| 1 | 5340000 | 20/60/100 | 30 | 5340000 | 756000 | 50 | 5335680 | 9121 | 9121 | 9127 |
| 2 | 5480000 | 20/60/100 | 30 | 5480040 | 765336 | 50 | 5475360 | 9218 | 9218 | 9225 |
| 2 | 5500000 | 20/60/100 | 30 | 5499840 | 766656 | 50 | 5495520 | 9232 | 9232 | 9238 |
| 2 | 5520000 | 20/60/100 | 30 | 5520000 | 768000 | 50 | 5515680 | 9246 | 9246 | 9252 |
| 2 | 5540000 | 20/60/100 | 30 | 5540160 | 769344 | 50 | 5535840 | 9260 | 9260 | 9266 |
| 2 | 5560000 | 20/60/100 | 30 | 5559960 | 770664 | 50 | 5554560 | 9273 | 9273 | 9280 |
| 2 | 5580000 | 20/60/100 | 30 | 5580120 | 772008 | 50 | 5574720 | 9287 | 9287 | 9294 |
| 2 | 5600000 | 20/60/100 | 30 | 5599920 | 773328 | 50 | 5594880 | 9301 | 9301 | 9308 |
| 2 | 5620000 | 20/60/100 | 30 | 5620080 | 774672 | 50 | 5615040 | 9315 | 9315 | 9322 |
| 2 | 5640000 | 20/60/100 | 30 | 5639880 | 775992 | 50 | 5635200 | 9329 | 9329 | 9336 |
| 2 | 5660000 | 20/60/100 | 30 | 5660040 | 777336 | 50 | 5655360 | 9343 | 9343 | 9350 |
| 2 | 5680000 | 20/60/100 | 30 | 5679840 | 778656 | 50 | 5675520 | 9357 | 9357 | 9363 |
| 2 | 5700000 | 20/60/100 | 30 | 5700000 | 780000 | 50 | 5695680 | 9371 | 9371 | 9377 |
| 2 | 5720000 | 20/60/100 | 30 | 5720160 | 781344 | 50 | 5715840 | 9385 | 9385 | 9391 |
| 3 | 5745000 | 20/60/100 | 30 | 5745000 | 783000 | 50 | 5740320 | 9402 | 9402 | 9409 |
| 3 | 5765000 | 20/60/100 | 30 | 5765160 | 784344 | 50 | 5760480 | 9416 | 9416 | 9423 |
| 3 | 5785000 | 20/60/100 | 30 | 5784960 | 785664 | 50 | 5780640 | 9430 | 9430 | 9436 |
| 3 | 5805000 | 20/60/100 | 30 | 5805120 | 787008 | 50 | 5800800 | 9444 | 9444 | 9450 |
| 3 | 5825000 | 20/60/100 | 30 | 5824920 | 788328 | 50 | 5819520 | 9457 | 9457 | 9464 |
| 3 | 5845000 | 20/60/100 | 30 | 5845080 | 789672 | 50 | 5839680 | 9471 | 9471 | 9478 |
| 3 | 5865000 | 20/60/100 | 30 | 5864880 | 790992 | 50 | 5859840 | 9485 | 9485 | 9492 |
| 3 | 5885000 | 20/60/100 | 30 | 5885040 | 792336 | 50 | 5880000 | 9499 | 9499 | 9506 |
| 3 | 5905000 | 20/60/100 | 30 | 5904840 | 793656 | 50 | 5900160 | 9513 | 9513 | 9520 |
| 1 | 5170000 | 40/80 | 30 | 5169900 | 744660 | 105 | 5155680 | 8996 | 8996 | 9016 |
| 1 | 5190000 | 40/80 | 30 | 5190060 | 746004 | 105 | 5175840 | 9010 | 9010 | 9030 |
| 1 | 5210000 | 40/80 | 30 | 5209860 | 747324 | 105 | 5194560 | 9023 | 9023 | 9044 |
| 1 | 5230000 | 40/80 | 30 | 5230020 | 748668 | 105 | 5214720 | 9037 | 9037 | 9058 |
| 1 | 5250000 | 40/80 | 30 | 5250000 | 750000 | 106 | 5234880 | 9051 | 9051 | 9072 |
| 1 | 5270000 | 40/80 | 30 | 5269980 | 751332 | 105 | 5255040 | 9065 | 9065 | 9086 |
| 1 | 5290000 | 40/80 | 30 | 5290140 | 752676 | 105 | 5275200 | 9079 | 9079 | 9100 |
| 1 | 5310000 | 40/80 | 30 | 5309940 | 753996 | 105 | 5295360 | 9093 | 9093 | 9113 |
| 1 | 5330000 | 40/80 | 30 | 5330100 | 755340 | 105 | 5315520 | 9107 | 9107 | 9127 |
| 2 | 5490000 | 40/80 | 30 | 5489940 | 765996 | 105 | 5475360 | 9218 | 9218 | 9238 |
| 2 | 5510000 | 40/80 | 30 | 5510100 | 767340 | 105 | 5495520 | 9232 | 9232 | 9252 |
| 2 | 5530000 | 40/80 | 30 | 5529900 | 768660 | 105 | 5515680 | 9246 | 9246 | 9266 |
| 2 | 5550000 | 40/80 | 30 | 5550060 | 770004 | 105 | 5535840 | 9260 | 9260 | 9280 |
| 2 | 5570000 | 40/80 | 30 | 5569860 | 771324 | 105 | 5554560 | 9273 | 9273 | 9294 |
| 2 | 5590000 | 40/80 | 30 | 5590020 | 772668 | 105 | 5574720 | 9287 | 9287 | 9308 |
| 2 | 5610000 | 40/80 | 30 | 5610000 | 774000 | 106 | 5594880 | 9301 | 9301 | 9322 |
| 2 | 5630000 | 40/80 | 30 | 5629980 | 775332 | 105 | 5615040 | 9315 | 9315 | 9336 |
| 2 | 5650000 | 40/80 | 30 | 5650140 | 776676 | 105 | 5635200 | 9329 | 9329 | 9350 |
| 2 | 5670000 | 40/80 | 30 | 5669940 | 777996 | 105 | 5655360 | 9343 | 9343 | 9363 |
| 2 | 5690000 | 40/80 | 30 | 5690100 | 779340 | 105 | 5675520 | 9357 | 9357 | 9377 |
| 2 | 5710000 | 40/80 | 30 | 5709900 | 780660 | 105 | 5695680 | 9371 | 9371 | 9391 |
| 3 | 5755000 | 40/80 | 30 | 5754900 | 783660 | 105 | 5740320 | 9402 | 9402 | 9422 |
| 3 | 5775000 | 40/80 | 30 | 5775060 | 785004 | 105 | 5760480 | 9416 | 9416 | 9436 |
| 3 | 5795000 | 40/80 | 30 | 5794860 | 786324 | 105 | 5780640 | 9430 | 9430 | 9450 |
| 3 | 5815000 | 40/80 | 30 | 5815020 | 787668 | 105 | 5800800 | 9444 | 9444 | 9464 |
| 3 | 5835000 | 40/80 | 30 | 5835000 | 789000 | 106 | 5819520 | 9457 | 9457 | 9478 |
| 3 | 5855000 | 40/80 | 30 | 5854980 | 790332 | 105 | 5839680 | 9471 | 9471 | 9492 |
| 3 | 5875000 | 40/80 | 30 | 5875140 | 791676 | 105 | 5859840 | 9485 | 9485 | 9506 |
| 3 | 5895000 | 40/80 | 30 | 5894940 | 792996 | 105 | 5880000 | 9499 | 9499 | 9520 |

TABLE 14

| UNII-Band | LTE Chn Raster [kHz] | BW [MHz] | Data SCS [kHz] | NR Chn Raster [kHz] | NR-ARFCN ($N_{REF}$) | N_PRB | SS Raster [kHz] | Min GSCN | Max GSCN | GSCN |
|---|---|---|---|---|---|---|---|---|---|---|
| 1 | 5160000 | 20/60/100 | 15 | 5160000 | 744000 | 104 | 5154240 | 8995 | 8995 | 9003 |
| 1 | 5180000 | 20/60/100 | 15 | 5180160 | 745344 | 104 | 5174400 | 9009 | 9009 | 9017 |
| 1 | 5200000 | 20/60/100 | 15 | 5199960 | 746664 | 104 | 5194560 | 9023 | 9023 | 9030 |
| 1 | 5220000 | 20/60/100 | 15 | 5220120 | 748008 | 104 | 5214720 | 9037 | 9037 | 9044 |
| 1 | 5240000 | 20/60/100 | 15 | 5239920 | 749328 | 104 | 5234880 | 9051 | 9051 | 9058 |

TABLE 14-continued

| UNII-Band | LTE Chn Raster [kHz] | BW [MHz] | Data SCS [kHz] | NR Chn Raster [kHz] | NR-ARFCN ($N_{REF}$) | N_PRB | SS Raster [kHz] | Min GSCN | Max GSCN | GSCN |
|---|---|---|---|---|---|---|---|---|---|---|
| 1 | 5260000 | 20/60/100 | 15 | 5260080 | 750672 | 104 | 5255040 | 9065 | 9065 | 9072 |
| 1 | 5280000 | 20/60/100 | 15 | 5279880 | 751992 | 104 | 5275200 | 9079 | 9079 | 9086 |
| 1 | 5300000 | 20/60/100 | 15 | 5300040 | 753336 | 104 | 5295360 | 9093 | 9093 | 9100 |
| 1 | 5320000 | 20/60/100 | 15 | 5319840 | 754656 | 104 | 5314080 | 9106 | 9106 | 9114 |
| 1 | 5340000 | 20/60/100 | 15 | 5340000 | 756000 | 104 | 5334240 | 9120 | 9120 | 9128 |
| 2 | 5480000 | 20/60/100 | 15 | 5480040 | 765336 | 104 | 5475360 | 9218 | 9218 | 9225 |
| 2 | 5500000 | 20/60/100 | 15 | 5499840 | 766656 | 104 | 5494080 | 9231 | 9231 | 9239 |
| 2 | 5520000 | 20/60/100 | 15 | 5520000 | 768000 | 104 | 5514240 | 9245 | 9245 | 9253 |
| 2 | 5540000 | 20/60/100 | 15 | 5540160 | 769344 | 104 | 5534400 | 9259 | 9259 | 9267 |
| 2 | 5560000 | 20/60/100 | 15 | 5559960 | 770664 | 104 | 5554560 | 9273 | 9273 | 9280 |
| 2 | 5580000 | 20/60/100 | 15 | 5580120 | 772008 | 104 | 5574720 | 9287 | 9287 | 9294 |
| 2 | 5600000 | 20/60/100 | 15 | 5599920 | 773328 | 104 | 5594880 | 9301 | 9301 | 9308 |
| 2 | 5620000 | 20/60/100 | 15 | 5620080 | 774672 | 104 | 5615040 | 9315 | 9315 | 9322 |
| 2 | 5640000 | 20/60/100 | 15 | 5639880 | 775992 | 104 | 5635200 | 9329 | 9329 | 9336 |
| 2 | 5660000 | 20/60/100 | 15 | 5660040 | 777336 | 104 | 5655360 | 9343 | 9343 | 9350 |
| 2 | 5680000 | 20/60/100 | 15 | 5679840 | 778656 | 104 | 5674080 | 9356 | 9356 | 9364 |
| 2 | 5700000 | 20/60/100 | 15 | 5700000 | 780000 | 104 | 5694240 | 9370 | 9370 | 9378 |
| 2 | 5720000 | 20/60/100 | 15 | 5720160 | 781344 | 104 | 5714400 | 9384 | 9384 | 9392 |
| 3 | 5745000 | 20/60/100 | 15 | 5745000 | 783000 | 104 | 5740320 | 9402 | 9402 | 9409 |
| 3 | 5765000 | 20/60/100 | 15 | 5765160 | 784344 | 104 | 5760480 | 9416 | 9416 | 9423 |
| 3 | 5785000 | 20/60/100 | 15 | 5784960 | 785664 | 104 | 5779200 | 9429 | 9429 | 9437 |
| 3 | 5805000 | 20/60/100 | 15 | 5805120 | 787008 | 104 | 5799360 | 9443 | 9443 | 9451 |
| 3 | 5825000 | 20/60/100 | 15 | 5824920 | 788328 | 104 | 5819520 | 9457 | 9457 | 9464 |
| 3 | 5845000 | 20/60/100 | 15 | 5845080 | 789672 | 104 | 5839680 | 9471 | 9471 | 9478 |
| 3 | 5865000 | 20/60/100 | 15 | 5864880 | 790992 | 104 | 5859840 | 9485 | 9485 | 9492 |
| 3 | 5885000 | 20/60/100 | 15 | 5885040 | 792336 | 104 | 5880000 | 9499 | 9499 | 9506 |
| 3 | 5905000 | 20/60/100 | 15 | 5904840 | 793656 | 104 | 5900160 | 9513 | 9513 | 9520 |
| 1 | 5170000 | 40/80 | 15 | 5169900 | 744660 | 214 | 5154240 | 8995 | 8995 | 9016 |
| 1 | 5190000 | 40/80 | 15 | 5190060 | 746004 | 214 | 5174400 | 9009 | 9009 | 9030 |
| 1 | 5210000 | 40/80 | 15 | 5209860 | 747324 | 214 | 5194560 | 9023 | 9023 | 9044 |
| 1 | 5230000 | 40/80 | 15 | 5230020 | 748668 | 214 | 5214720 | 9037 | 9037 | 9058 |
| 1 | 5250000 | 40/80 | 15 | 5250000 | 750000 | 216 | 5234880 | 9051 | 9051 | 9072 |
| 1 | 5270000 | 40/80 | 15 | 5269980 | 751332 | 214 | 5255040 | 9065 | 9065 | 9086 |
| 1 | 5290000 | 40/80 | 15 | 5290140 | 752676 | 214 | 5275200 | 9079 | 9079 | 9100 |
| 1 | 5310000 | 40/80 | 15 | 5309940 | 753996 | 214 | 5295360 | 9093 | 9093 | 9114 |
| 1 | 5330000 | 40/80 | 15 | 5330100 | 755340 | 214 | 5315520 | 9107 | 9107 | 9128 |
| 2 | 5490000 | 40/80 | 15 | 5489940 | 765996 | 214 | 5475360 | 9218 | 9218 | 9239 |
| 2 | 5510000 | 40/80 | 15 | 5510100 | 767340 | 214 | 5495520 | 9232 | 9232 | 9253 |
| 2 | 5530000 | 40/80 | 15 | 5529900 | 768660 | 214 | 5514240 | 9245 | 9245 | 9266 |
| 2 | 5550000 | 40/80 | 15 | 5550060 | 770004 | 214 | 5534400 | 9259 | 9259 | 9280 |
| 2 | 5570000 | 40/80 | 15 | 5569860 | 771324 | 214 | 5554560 | 9273 | 9273 | 9294 |
| 2 | 5590000 | 40/80 | 15 | 5590020 | 772668 | 214 | 5574720 | 9287 | 9287 | 9308 |
| 2 | 5610000 | 40/80 | 15 | 5610000 | 774000 | 216 | 5594880 | 9301 | 9301 | 9322 |
| 2 | 5630000 | 40/80 | 15 | 5629980 | 775332 | 214 | 5615040 | 9315 | 9315 | 9336 |
| 2 | 5650000 | 40/80 | 15 | 5650140 | 776676 | 214 | 5635200 | 9329 | 9329 | 9350 |
| 2 | 5670000 | 40/80 | 15 | 5669940 | 777996 | 214 | 5655360 | 9343 | 9343 | 9364 |
| 2 | 5690000 | 40/80 | 15 | 5690100 | 779340 | 214 | 5675520 | 9357 | 9357 | 9378 |
| 2 | 5710000 | 40/80 | 15 | 5709900 | 780660 | 214 | 5694240 | 9370 | 9370 | 9391 |
| 3 | 5755000 | 40/80 | 15 | 5754900 | 783660 | 214 | 5740320 | 9402 | 9402 | 9423 |
| 3 | 5775000 | 40/80 | 15 | 5775060 | 785004 | 214 | 5760480 | 9416 | 9416 | 9437 |
| 3 | 5795000 | 40/80 | 15 | 5794860 | 786324 | 214 | 5779200 | 9429 | 9429 | 9450 |
| 3 | 5815000 | 40/80 | 15 | 5815020 | 787668 | 214 | 5799360 | 9443 | 9443 | 9464 |
| 3 | 5835000 | 40/80 | 15 | 5835000 | 789000 | 216 | 5819520 | 9457 | 9457 | 9478 |
| 3 | 5855000 | 40/80 | 15 | 5854980 | 790332 | 214 | 5839680 | 9471 | 9471 | 9492 |
| 3 | 5875000 | 40/80 | 15 | 5875140 | 791676 | 214 | 5859840 | 9485 | 9485 | 9506 |
| 3 | 5895000 | 40/80 | 15 | 5894940 | 792996 | 214 | 5880000 | 9499 | 9499 | 9520 |

Example Set of Channel Raster & SSB Raster Entries for 30 kHz & 15 kHz With 1 Unique Channel Raster Entry per LTE 20 MHz Channel That Maximizes the Supported Number of PRBs The example channel raster and SSB raster entries shown in Table 8 to Table 14, provide channel raster entries that have uniform number of PRBs that could be supported in channel. It is possible to squeeze extra system capacity for certain NR channel raster points by utilizing more PRBs that still satisfy all the conditions mentioned above (e.g. minimum guard band, PRB grid alignment, PRB and SSB PRB grid alignment, etc.).

Accordingly, down selection is performed to select NR channel raster entries that support the maximum number of PRB and choose only 1 NR channel entry per LTE channel raster entry for 20 MHz. This is shown in Table 15 and Table 16. This may result in slightly different NR channel raster entry for the 30 kHz and 15 kHz data subcarrier cases.

TABLE 15

| UNII-Band | LTE Chn Raster [kHz] | BW [MHz] | Data SCS [kHz] | NR Chn Raster [kHz] | NR-ARFCN (N_REF) | N_PRB | SS Raster [kHz] | GSCN | Min GSCN | Max GSCN |
|---|---|---|---|---|---|---|---|---|---|---|
| 1 | 5160000 | 20/60/100 | 30 | 5160000 | 744000 | 50 | 5155680 | 8996 | 8996 | 9002 |
| 1 | 5180000 | 20/60/100 | 30 | 5180160 | 745344 | 50 | 5175840 | 9010 | 9010 | 9016 |
| 1 | 5200000 | 20/60/100 | 30 | 5199960 | 746664 | 50 | 5194560 | 9023 | 9023 | 9030 |
| 1 | 5220000 | 20/60/100 | 30 | 5220120 | 748008 | 50 | 5214720 | 9037 | 9037 | 9044 |
| 1 | 5240000 | 20/60/100 | 30 | 5239920 | 749328 | 50 | 5234880 | 9051 | 9051 | 9058 |
| 1 | 5260000 | 20/60/100 | 30 | 5260080 | 750672 | 50 | 5255040 | 9065 | 9065 | 9072 |
| 1 | 5280000 | 20/60/100 | 30 | 5279880 | 751992 | 50 | 5275200 | 9079 | 9079 | 9086 |
| 1 | 5300000 | 20/60/100 | 30 | 5300040 | 753336 | 50 | 5295360 | 9093 | 9093 | 9100 |
| 1 | 5320000 | 20/60/100 | 30 | 5320020 | 754668 | 51 | 5315520 | 9107 | 9107 | 9114 |
| 1 | 5340000 | 20/60/100 | 30 | 5340000 | 756000 | 50 | 5335680 | 9121 | 9121 | 9127 |
| 2 | 5480000 | 20/60/100 | 30 | 5480040 | 765336 | 50 | 5475360 | 9218 | 9218 | 9225 |
| 2 | 5500000 | 20/60/100 | 30 | 5500020 | 766668 | 51 | 5495520 | 9232 | 9232 | 9239 |
| 2 | 5520000 | 20/60/100 | 30 | 5520000 | 768000 | 50 | 5515680 | 9246 | 9246 | 9252 |
| 2 | 5540000 | 20/60/100 | 30 | 5540160 | 769344 | 50 | 5535840 | 9260 | 9260 | 9266 |
| 2 | 5560000 | 20/60/100 | 30 | 5559960 | 770664 | 50 | 5554560 | 9273 | 9273 | 9280 |
| 2 | 5580000 | 20/60/100 | 30 | 5580120 | 772008 | 50 | 5574720 | 9287 | 9287 | 9294 |
| 2 | 5600000 | 20/60/100 | 30 | 5599920 | 773328 | 50 | 5594880 | 9301 | 9301 | 9308 |
| 2 | 5620000 | 20/60/100 | 30 | 5620080 | 774672 | 50 | 5615040 | 9315 | 9315 | 9322 |
| 2 | 5640000 | 20/60/100 | 30 | 5639880 | 775992 | 50 | 5635200 | 9329 | 9329 | 9336 |
| 2 | 5660000 | 20/60/100 | 30 | 5660040 | 777336 | 50 | 5655360 | 9343 | 9343 | 9350 |
| 2 | 5680000 | 20/60/100 | 30 | 5680020 | 778668 | 51 | 5675520 | 9357 | 9357 | 9364 |
| 2 | 5700000 | 20/60/100 | 30 | 5700000 | 780000 | 50 | 5695680 | 9371 | 9371 | 9377 |
| 2 | 5720000 | 20/60/100 | 30 | 5720160 | 781344 | 50 | 5715840 | 9385 | 9385 | 9391 |
| 3 | 5745000 | 20/60/100 | 30 | 5745000 | 783000 | 50 | 5740320 | 9402 | 9402 | 9409 |
| 3 | 5765000 | 20/60/100 | 30 | 5765160 | 784344 | 50 | 5760480 | 9416 | 9416 | 9423 |
| 3 | 5785000 | 20/60/100 | 30 | 5784960 | 785664 | 50 | 5780640 | 9430 | 9430 | 9436 |
| 3 | 5805000 | 20/60/100 | 30 | 5805120 | 787008 | 50 | 5800800 | 9444 | 9444 | 9450 |
| 3 | 5825000 | 20/60/100 | 30 | 5824920 | 788328 | 50 | 5819520 | 9457 | 9457 | 9464 |
| 3 | 5845000 | 20/60/100 | 30 | 5845080 | 789672 | 50 | 5839680 | 9471 | 9471 | 9478 |
| 3 | 5865000 | 20/60/100 | 30 | 5864880 | 790992 | 50 | 5859840 | 9485 | 9485 | 9492 |
| 3 | 5885000 | 20/60/100 | 30 | 5885040 | 792336 | 50 | 5880000 | 9499 | 9499 | 9506 |
| 3 | 5905000 | 20/60/100 | 30 | 5905020 | 793668 | 51 | 5900160 | 9513 | 9513 | 9520 |
| 1 | 5170000 | 40/80 | 30 | 5169900 | 744660 | 105 | 5155680 | 8996 | 8996 | 9016 |
| 1 | 5190000 | 40/80 | 30 | 5190060 | 746004 | 105 | 5175840 | 9010 | 9010 | 9030 |
| 1 | 5210000 | 40/80 | 30 | 5209860 | 747324 | 105 | 5194560 | 9023 | 9023 | 9044 |
| 1 | 5230000 | 40/80 | 30 | 5230020 | 748668 | 105 | 5214720 | 9037 | 9037 | 9058 |
| 1 | 5250000 | 40/80 | 30 | 5250000 | 750000 | 106 | 5234880 | 9051 | 9051 | 9072 |
| 1 | 5270000 | 40/80 | 30 | 5269980 | 751332 | 105 | 5255040 | 9065 | 9065 | 9086 |
| 1 | 5290000 | 40/80 | 30 | 5290140 | 752676 | 105 | 5275200 | 9079 | 9079 | 9100 |
| 1 | 5310000 | 40/80 | 30 | 5309940 | 753996 | 105 | 5295360 | 9093 | 9093 | 9113 |
| 1 | 5330000 | 40/80 | 30 | 5330100 | 755340 | 105 | 5315520 | 9107 | 9107 | 9127 |
| 2 | 5490000 | 40/80 | 30 | 5489940 | 765996 | 105 | 5475360 | 9218 | 9218 | 9238 |
| 2 | 5510000 | 40/80 | 30 | 5510100 | 767340 | 105 | 5495520 | 9232 | 9232 | 9252 |
| 2 | 5530000 | 40/80 | 30 | 5529900 | 768660 | 105 | 5515680 | 9246 | 9246 | 9266 |
| 2 | 5550000 | 40/80 | 30 | 5550060 | 770004 | 105 | 5535840 | 9260 | 9260 | 9280 |
| 2 | 5570000 | 40/80 | 30 | 5569860 | 771324 | 105 | 5554560 | 9273 | 9273 | 9294 |
| 2 | 5590000 | 40/80 | 30 | 5590020 | 772668 | 105 | 5574720 | 9287 | 9287 | 9308 |
| 2 | 5610000 | 40/80 | 30 | 5610000 | 774000 | 106 | 5594880 | 9301 | 9301 | 9322 |
| 2 | 5630000 | 40/80 | 30 | 5629980 | 775332 | 105 | 5615040 | 9315 | 9315 | 9336 |
| 2 | 5650000 | 40/80 | 30 | 5650140 | 776676 | 105 | 5635200 | 9329 | 9329 | 9350 |
| 2 | 5670000 | 40/80 | 30 | 5669940 | 777996 | 105 | 5655360 | 9343 | 9343 | 9363 |
| 2 | 5690000 | 40/80 | 30 | 5690100 | 779340 | 105 | 5675520 | 9357 | 9357 | 9377 |
| 2 | 5710000 | 40/80 | 30 | 5709900 | 780660 | 105 | 5695680 | 9371 | 9371 | 9391 |
| 3 | 5755000 | 40/80 | 30 | 5754900 | 783660 | 105 | 5740320 | 9402 | 9402 | 9422 |
| 3 | 5775000 | 40/80 | 30 | 5775060 | 785004 | 105 | 5760480 | 9416 | 9416 | 9436 |
| 3 | 5795000 | 40/80 | 30 | 5794860 | 786324 | 105 | 5780640 | 9430 | 9430 | 9450 |
| 3 | 5815000 | 40/80 | 30 | 5815020 | 787668 | 105 | 5800800 | 9444 | 9444 | 9464 |
| 3 | 5835000 | 40/80 | 30 | 5835000 | 789000 | 106 | 5819520 | 9457 | 9457 | 9478 |
| 3 | 5855000 | 40/80 | 30 | 5854980 | 790332 | 105 | 5839680 | 9471 | 9471 | 9492 |
| 3 | 5875000 | 40/80 | 30 | 5875140 | 791676 | 105 | 5859840 | 9485 | 9485 | 9506 |
| 3 | 5895000 | 40/80 | 30 | 5894940 | 792996 | 105 | 5880000 | 9499 | 9499 | 9520 |

TABLE 16

| UNII-Band | LTE Chn Raster [kHz] | BW [MHz] | Data SCS [kHz] | NR Chn Raster [kHz] | NR-ARFCN (N_REF) | N_PRB | SS Raster [kHz] | GSCN | Min GSCN | Max GSCN |
|---|---|---|---|---|---|---|---|---|---|---|
| 1 | 5160000 | 20/60/100 | 15 | 5160090 | 744006 | 105 | 5154240 | 8995 | 8995 | 9003 |
| 1 | 5180000 | 20/60/100 | 15 | 5180160 | 745344 | 104 | 5174400 | 9009 | 9009 | 9017 |
| 1 | 5200000 | 20/60/100 | 15 | 5200050 | 746670 | 105 | 5194560 | 9023 | 9023 | 9030 |
| 1 | 5220000 | 20/60/100 | 15 | 5220120 | 748008 | 104 | 5214720 | 9037 | 9037 | 9044 |
| 1 | 5240000 | 20/60/100 | 15 | 5240010 | 749334 | 105 | 5234880 | 9051 | 9051 | 9058 |

TABLE 16-continued

| UNII-Band | LTE Chn Raster [kHz] | BW [MHz] | Data SCS [kHz] | NR Chn Raster [kHz] | NR-ARFCN ($N_{REF}$) | N_PRB | SS Raster [kHz] | GSCN | Min GSCN | Max GSCN |
|---|---|---|---|---|---|---|---|---|---|---|
| 1 | 5260000 | 20/60/100 | 15 | 5260080 | 750672 | 104 | 5255040 | 9065 | 9065 | 9072 |
| 1 | 5280000 | 20/60/100 | 15 | 5279970 | 751998 | 105 | 5275200 | 9079 | 9079 | 9086 |
| 1 | 5300000 | 20/60/100 | 15 | 5300040 | 753336 | 104 | 5295360 | 9093 | 9093 | 9100 |
| 1 | 5320000 | 20/60/100 | 15 | 5319930 | 754662 | 105 | 5314080 | 9106 | 9106 | 9114 |
| 1 | 5340000 | 20/60/100 | 15 | 5340090 | 756006 | 105 | 5334240 | 9120 | 9120 | 9128 |
| 2 | 5480000 | 20/60/100 | 15 | 5480040 | 765336 | 104 | 5475360 | 9218 | 9218 | 9225 |
| 2 | 5500000 | 20/60/100 | 15 | 5499930 | 766662 | 105 | 5494080 | 9231 | 9231 | 9239 |
| 2 | 5520000 | 20/60/100 | 15 | 5520090 | 768006 | 105 | 5514240 | 9245 | 9245 | 9253 |
| 2 | 5540000 | 20/60/100 | 15 | 5540160 | 769344 | 104 | 5534400 | 9259 | 9259 | 9267 |
| 2 | 5560000 | 20/60/100 | 15 | 5560050 | 770670 | 105 | 5554560 | 9273 | 9273 | 9280 |
| 2 | 5580000 | 20/60/100 | 15 | 5580120 | 772008 | 104 | 5574720 | 9287 | 9287 | 9294 |
| 2 | 5600000 | 20/60/100 | 15 | 5600010 | 773334 | 105 | 5594880 | 9301 | 9301 | 9308 |
| 2 | 5620000 | 20/60/100 | 15 | 5620080 | 774672 | 104 | 5615040 | 9315 | 9315 | 9322 |
| 2 | 5640000 | 20/60/100 | 15 | 5639970 | 775998 | 105 | 5635200 | 9329 | 9329 | 9336 |
| 2 | 5660000 | 20/60/100 | 15 | 5660040 | 777336 | 104 | 5655360 | 9343 | 9343 | 9350 |
| 2 | 5680000 | 20/60/100 | 15 | 5679930 | 778662 | 105 | 5674080 | 9356 | 9356 | 9364 |
| 2 | 5700000 | 20/60/100 | 15 | 5700090 | 780006 | 105 | 5694240 | 9370 | 9370 | 9378 |
| 2 | 5720000 | 20/60/100 | 15 | 5720160 | 781344 | 104 | 5714400 | 9384 | 9384 | 9392 |
| 3 | 5745000 | 20/60/100 | 15 | 5745090 | 783006 | 105 | 5740320 | 9402 | 9402 | 9409 |
| 3 | 5765000 | 20/60/100 | 15 | 5765160 | 784344 | 104 | 5760480 | 9416 | 9416 | 9423 |
| 3 | 5785000 | 20/60/100 | 15 | 5785050 | 785670 | 105 | 5779200 | 9429 | 9429 | 9437 |
| 3 | 5805000 | 20/60/100 | 15 | 5805120 | 787008 | 104 | 5799360 | 9443 | 9443 | 9451 |
| 3 | 5825000 | 20/60/100 | 15 | 5825010 | 788334 | 105 | 5819520 | 9457 | 9457 | 9464 |
| 3 | 5845000 | 20/60/100 | 15 | 5845080 | 789672 | 104 | 5839680 | 9471 | 9471 | 9478 |
| 3 | 5865000 | 20/60/100 | 15 | 5864970 | 790998 | 105 | 5859840 | 9485 | 9485 | 9492 |
| 3 | 5885000 | 20/60/100 | 15 | 5885040 | 792336 | 104 | 5880000 | 9499 | 9499 | 9506 |
| 3 | 5905000 | 20/60/100 | 15 | 5904930 | 793662 | 105 | 5900160 | 9513 | 9513 | 9520 |
| 1 | 5170000 | 40/80 | 15 | 5169990 | 744666 | 215 | 5154240 | 8995 | 8995 | 9016 |
| 1 | 5190000 | 40/80 | 15 | 5190060 | 746004 | 214 | 5174400 | 9009 | 9009 | 9030 |
| 1 | 5210000 | 40/80 | 15 | 5209950 | 747330 | 215 | 5194560 | 9023 | 9023 | 9044 |
| 1 | 5230000 | 40/80 | 15 | 5230020 | 748668 | 214 | 5214720 | 9037 | 9037 | 9058 |
| 1 | 5250000 | 40/80 | 15 | 5250000 | 750000 | 216 | 5234880 | 9051 | 9051 | 9072 |
| 1 | 5270000 | 40/80 | 15 | 5270070 | 751338 | 215 | 5255040 | 9065 | 9065 | 9086 |
| 1 | 5290000 | 40/80 | 15 | 5290140 | 752676 | 214 | 5275200 | 9079 | 9079 | 9100 |
| 1 | 5310000 | 40/80 | 15 | 5310030 | 754002 | 215 | 5295360 | 9093 | 9093 | 9114 |
| 1 | 5330000 | 40/80 | 15 | 5330100 | 755340 | 214 | 5315520 | 9107 | 9107 | 9128 |
| 2 | 5490000 | 40/80 | 15 | 5490030 | 766002 | 215 | 5475360 | 9218 | 9218 | 9239 |
| 2 | 5510000 | 40/80 | 15 | 5510100 | 767340 | 214 | 5495520 | 9232 | 9232 | 9253 |
| 2 | 5530000 | 40/80 | 15 | 5529990 | 768666 | 215 | 5514240 | 9245 | 9245 | 9266 |
| 2 | 5550000 | 40/80 | 15 | 5550060 | 770004 | 214 | 5534400 | 9259 | 9259 | 9280 |
| 2 | 5570000 | 40/80 | 15 | 5569950 | 771330 | 215 | 5554560 | 9273 | 9273 | 9294 |
| 2 | 5590000 | 40/80 | 15 | 5590020 | 772668 | 214 | 5574720 | 9287 | 9287 | 9308 |
| 2 | 5610000 | 40/80 | 15 | 5610000 | 774000 | 216 | 5594880 | 9301 | 9301 | 9322 |
| 2 | 5630000 | 40/80 | 15 | 5630070 | 775338 | 215 | 5615040 | 9315 | 9315 | 9336 |
| 2 | 5650000 | 40/80 | 15 | 5650140 | 776676 | 214 | 5635200 | 9329 | 9329 | 9350 |
| 2 | 5670000 | 40/80 | 15 | 5670030 | 778002 | 215 | 5655360 | 9343 | 9343 | 9364 |
| 2 | 5690000 | 40/80 | 15 | 5690100 | 779340 | 214 | 5675520 | 9357 | 9357 | 9378 |
| 2 | 5710000 | 40/80 | 15 | 5709990 | 780666 | 215 | 5694240 | 9370 | 9370 | 9391 |
| 3 | 5755000 | 40/80 | 15 | 5754990 | 783666 | 215 | 5740320 | 9402 | 9402 | 9423 |
| 3 | 5775000 | 40/80 | 15 | 5775060 | 785004 | 214 | 5760480 | 9416 | 9416 | 9437 |
| 3 | 5795000 | 40/80 | 15 | 5794950 | 786330 | 215 | 5779200 | 9429 | 9429 | 9450 |
| 3 | 5815000 | 40/80 | 15 | 5815020 | 787668 | 214 | 5799360 | 9443 | 9443 | 9464 |
| 3 | 5835000 | 40/80 | 15 | 5835000 | 789000 | 216 | 5819520 | 9457 | 9457 | 9478 |
| 3 | 5855000 | 40/80 | 15 | 5855070 | 790338 | 215 | 5839680 | 9471 | 9471 | 9492 |
| 3 | 5875000 | 40/80 | 15 | 5875140 | 791676 | 214 | 5859840 | 9485 | 9485 | 9506 |
| 3 | 5895000 | 40/80 | 15 | 5895030 | 793002 | 215 | 5880000 | 9499 | 9499 | 9520 |

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 5:
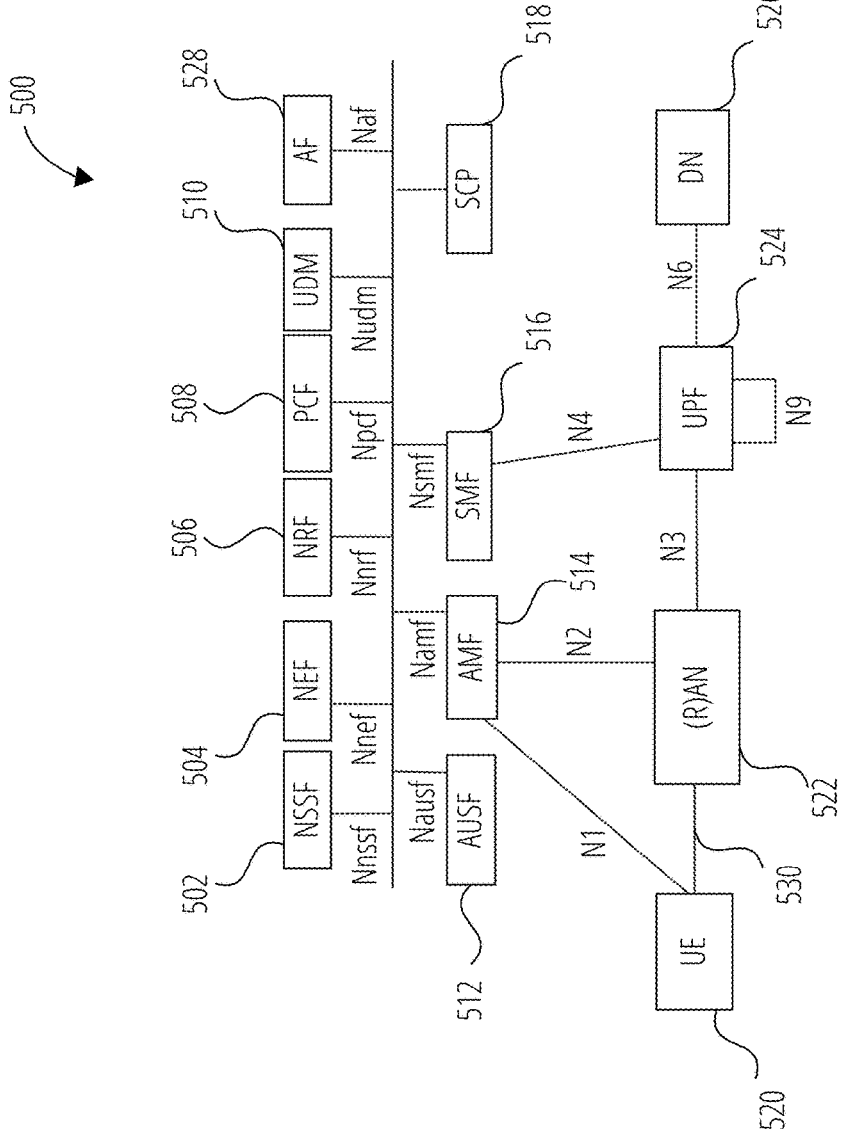
FIG. 5 illustrates an example service based architecture in accordance with certain embodiments.

FIG. 5 illustrates a service based architecture 500 in 5GS according to one embodiment. As described in 3GPP TS 23.501, the service based architecture 500 comprises NFs such as an NSSF 502, a NEF 504, an NRF 506, a PCF 508, a UDM 510, an AUSF 512, an AMF 514, an SMF 516, for communication with a UE 520, a (R)AN 522, a UPF 524, and a DN 526. The NFs and NF services can communicate directly, referred to as Direct Communication, or indirectly via a SCP 518, referred to as Indirect Communication. FIG. 5 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 5 are described below.

The NSSF 502 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 504 supports exposure of capabilities and events. NF capabilities and events may be securely exposed by the NEF 504 (e.g., for 3rd party, Application Functions, and/or Edge Computing). The NEF 504 may store/retrieve information as structured data using a standardized interface (Nudr) to a UDR. The NEF 504 may also secure provision of information from an external application to 3GPP network and may provide for the Application Functions to securely provide information to the 3GPP network (e.g., expected UE behavior, 5GLAN group information, and service specific information), wherein the NEF 504 may authenticate and authorize and assist in throttling the Application Functions. The NEF 504 may provide translation of internal-external information by translating between information exchanged with the AF and information exchanged with the internal network function. For example, the NEF 504 translates between an AF-Service-Identifier and internal 5G Core information such as DNN and S-NSSAI. The NEF 504 may handle masking of network and user sensitive information to external AF's according to the network policy. The NEF 504 may receive information from other network functions (based on exposed capabilities of other network functions), and stores the received information as structured data using a standardized interface to a UDR. The stored information can be accessed and re-exposed by the NEF 504 to other network functions and Application Functions, and used for other purposes such as analytics. For external exposure of services related to specific UE(s), the NEF 504 may reside in the HPLMN. Depending on operator agreements, the NEF 504 in the HPLMN may have interface(s) with NF(s) in the VPLMN. When a UE is capable of switching between EPC and 5GC, an SCEF+NEF may be used for service exposure.

The NRF 506 supports service discovery function by receiving an NF Discovery Request from an NF instance or SCP and providing the information of the discovered NF instances to the NF instance or SCP. The NRF 506 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 508 supports a unified policy framework to govern network behavior. The PCF 508 provides policy rules to Control Plane function(s) to enforce them. The PCF 508 accesses subscription information relevant for policy decisions in a Unified Data Repository (UDR). The PCF 508 may access the UDR located in the same PLMN as the PCF.

The UDM 510 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions. MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 510 uses subscription data (including authentication data) that may be stored in a UDR, in which case a UDM implements the application logic and may not require an internal user data storage and several different UDMs may serve the same user in different transactions. The UDM 510 may be located in the HPLMN of the subscribers it serves, and may access the information of the UDR located in the same PLMN.

The AF 528 interacts with the Core Network to provide services that, for example, support the following: application influence on traffic routing; accessing the NEF 504; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 504 to interact with relevant Network Functions.

The AUSF 512 supports authentication for 3GPP access and untrusted non-3GPP access. The AUSF 512 may also provide support for Network Slice-Specific Authentication and Authorization.

The AMF 514 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 514. Regardless of the number of Network functions, in certain embodiments there is only one NAS interface instance per access network between the UE and the CN, terminated at one of the Network functions that implements at least NAS security and Mobility Management. The AMF 514 may also include policy related functionalities.

In addition to the functionalities described above, the AMF 514 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 516 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 516 may include policy related functionalities.

The SCP 518 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 518 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 520 may include a device with radio communication capabilities. For example, the UE 520 may comprise a smartphone (e.g., handheld touchscreen mobile computing devices connectable to one or more cellular networks). The UE 520 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 520 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 520 may be configured to connect or communicatively couple with the (R)AN 522 through a radio interface 530, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 520 and the (R)AN 522 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 522 to the UE 520 and a UL transmission may be from the UE 520 to the (R)AN 522. The UE 520 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 522 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 522 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 522) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 520 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 524 may act as an anchor point for intra-RAT and inter-RAT mobility, an external PDU session point of interconnect to the DN 526, and a branching point to support multi-homed PDU session. The UPF 524 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 524 may include an uplink classifier to support routing traffic flows to a data network. The DN 526 may represent various network operator services, Internet access, or third party services. The DN 526 may include, for example, an application server.

Figure 6:
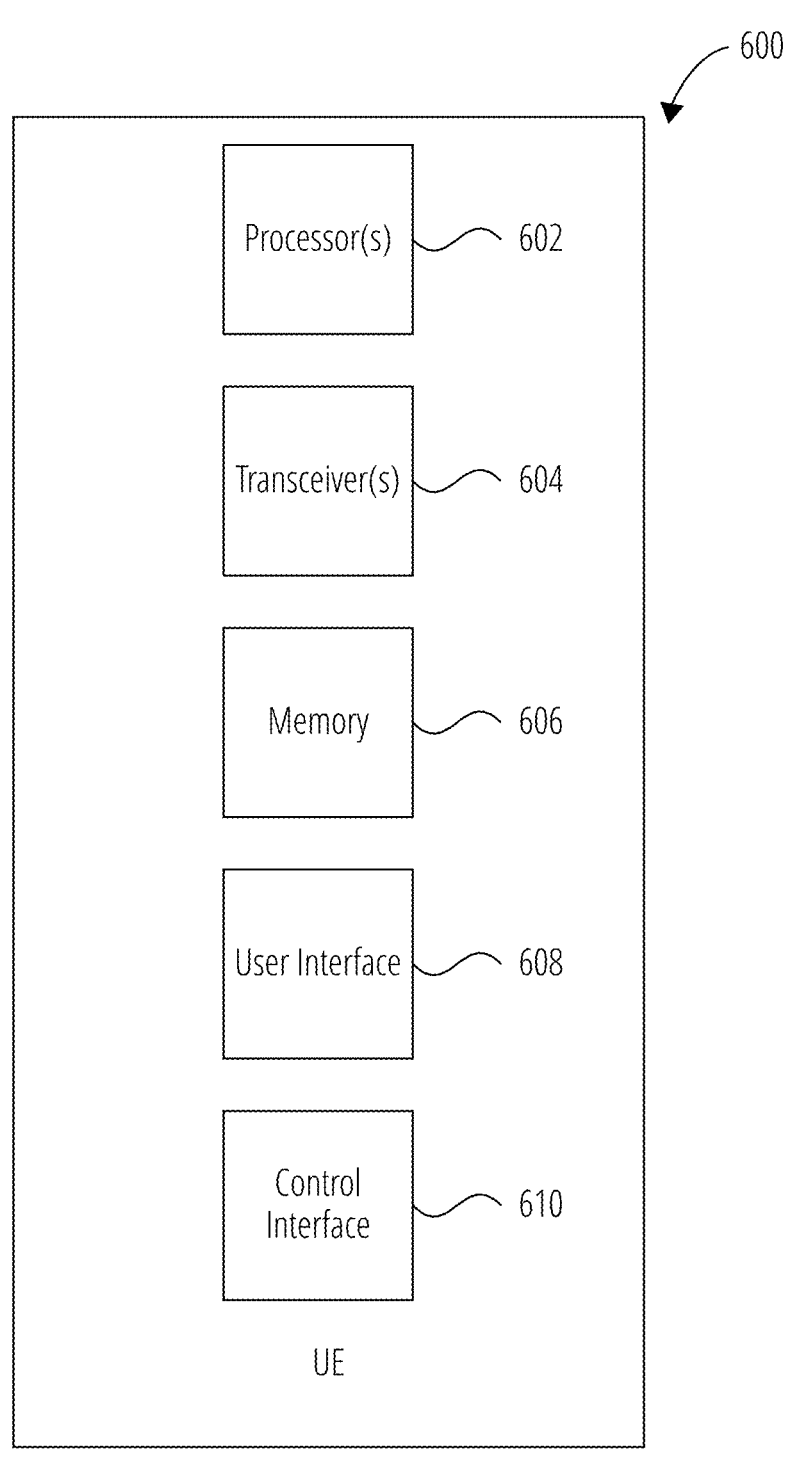
FIG. 6 illustrates a UE in accordance with one embodiment.

FIG. 6 is a block diagram of an example UE 600 configurable according to various embodiments of the present disclosure, including by execution of instructions on a computer-readable medium that correspond to any of the example methods and/or procedures described herein. The UE 600 comprises one or more processor 602, transceiver 604, memory 606, user interface 608, and control interface 610.

The one or more processor 602 may include, for example, an application processor, an audio digital signal processor, a central processing unit, and/or one or more baseband processors. Each of the one or more processor 602 may include internal memory and/or may include interface(s) to communication with external memory (including the memory 606). The internal or external memory can store software code, programs, and/or instructions for execution by the one or more processor 602 to configure and/or facilitate the UE 600 to perform various operations, including operations described herein. For example, execution of the instructions can configure the UE 600 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 604, user interface 608, and/or control interface 610. As another example, the one or more processor 602 may execute program code stored in the memory 606 or other memory that corresponds to MAC, RLC, PDCP, and RRC layer protocols standardized by 3GPP (e.g., for NR and/or LTE). As a further example, the processor 602 may execute program code stored in the memory 606 or other memory that, together with the one or more transceiver 604, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 606 may comprise memory area for the one or more processor 602 to store variables used in protocols, configuration, control, and other functions of the UE 600, including operations corresponding to, or comprising, any of the example methods and/or procedures described herein. Moreover, the memory 606 may comprise non-volatile memory (e.g., flash memory), volatile memory (e.g., static or dynamic RAM), or a combination thereof. Furthermore, the memory 606 may interface with a memory slot by which removable memory cards in one or more formats (e.g., SD Card, Memory Stick, Compact Flash, etc.) can be inserted and removed.

The one or more transceiver 604 may include radio-frequency transmitter and/or receiver circuitry that facilitates the UE 600 to communicate with other equipment supporting like wireless communication standards and/or protocols. For example, the one or more transceiver 604 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 602. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 604 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 602 to implement a PHY layer based on OFDM, OFDMA, and/or SC-FDMA technologies, such as described herein with respect to other figures.

The user interface 608 may take various forms depending on particular embodiments, or can be absent from the UE 600. In some embodiments, the user interface 608 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 600 may comprise a tablet computing device including a larger touchscreen display. In such embodiments, one or more of the mechanical features of the user interface 608 may be replaced by comparable or functionally equivalent virtual user interface features (e.g., virtual keypad, virtual buttons, etc.) implemented using the touchscreen display, as familiar to persons of ordinary skill in the art. In other embodiments, the UE 600 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 600 having a touch screen display are capable of receiving user inputs, such as inputs related to exemplary methods and/or procedures described herein or otherwise known to persons of ordinary skill in the art.

In some exemplary embodiments of the present disclosure, the UE 600 may include an orientation sensor, which can be used in various ways by features and functions of the UE 600. For example, the UE 600 can use outputs of the orientation sensor to determine when a user has changed the physical orientation of the UE 600's touch screen display. An indication signal from the orientation sensor can be available to any application program executing on the UE 600, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 610 may take various forms depending on particular embodiments. For example, the control interface 610 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 610 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 600 may include more functionality than is shown in FIG. 6 including, for example, a video and/or still-image camera, microphone, media player and/or recorder, etc. Moreover, the one or more transceiver 604 may include circuitry for communication using additional radio-frequency communication standards including Bluetooth, GPS, and/or others. Moreover, the one or more processor 602 may execute software code stored in the memory 606 to control such additional functionality. For example, directional velocity and/or position estimates output from a GPS receiver can be available to any application program executing on the UE 600, including various exemplary methods and/or computer-readable media according to various exemplary embodiments of the present disclosure.

Figure 7:
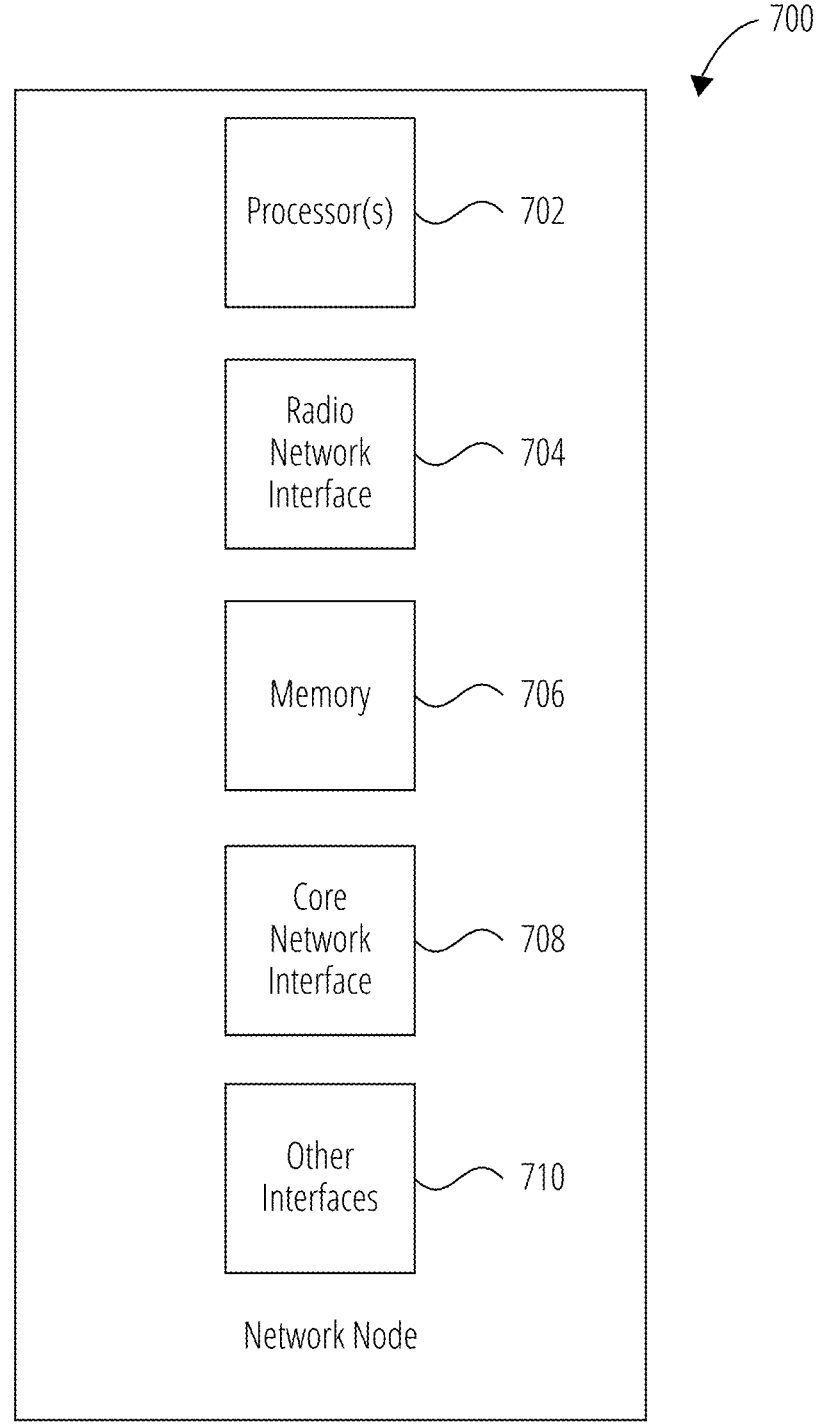
FIG. 7 illustrates a network node in accordance with one embodiment.

FIG. 7 is a block diagram of an example network node 700 configurable according to various embodiments of the present disclosure, including by execution of instructions on a computer-readable medium that correspond to any of the example methods and/or procedures described herein.

The network node 700 includes a one or more processor 702, a radio network interface 704, a memory 706, a core network interface 708, and other interfaces 710. The network node 700 may comprise, for example, a base station, eNB, gNB, access node, or component thereof.

The one or more processor 702 may include any type of processor or processing circuitry and may be configured to perform any of the methods or procedures disclosed herein. The memory 706 may store software code, programs, and/or instructions executed by the one or more processor 702 to configure the network node 700 to perform various operations, including operations described herein. For example, execution of such stored instructions can configure the network node 700 to communicate with one or more other devices using protocols according to various embodiments of the present disclosure, including one or more methods and/or procedures discussed above. Furthermore, execution of such stored instructions can also configure and/or facilitate the network node 700 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 704 and the core network interface 708. By way of example and without limitation, the core network interface 708 comprise an S1 interface and the radio network interface 704 may comprise a Uu interface, as standardized by 3GPP. The memory 706 may also store variables used in protocols, configuration, control, and other functions of the network node 700. As such, the memory 706 may comprise non-volatile memory (e.g., flash memory, hard disk, etc.), volatile memory (e.g., static or dynamic RAM), network-based (e.g., "cloud") storage, or a combination thereof.

The radio network interface 704 may include transmitters, receivers, signal processors, ASICs, antennas, beamforming units, and other circuitry that enables network node 700 to communicate with other equipment such as, in some embodiments, a plurality of compatible user equipment (UE). In some embodiments, the network node 700 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 704 may include a PHY layer based on OFDM, OFDMA, and/or SC-FDMA technologies. In some embodiments, the functionality of such a PHY layer can be provided cooperatively by the radio network interface 704 and the one or more processor 702.

The core network interface 708 may include transmitters, receivers, and other circuitry that enables the network node 700 to communicate with other equipment in a core network such as, in some embodiments, circuit-switched (CS) and/or packet-switched Core (PS) networks. In some embodiments, the core network interface 708 may include the S1 interface standardized by 3GPP. In some embodiments, the core network interface 708 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 708 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 710 may include transmitters, receivers, and other circuitry that enables the network node 700 to communicate with external networks, computers, databases, and the like for purposes of operations, administration, and maintenance of the network node 700 or other network equipment operably connected thereto.

Figure 8:
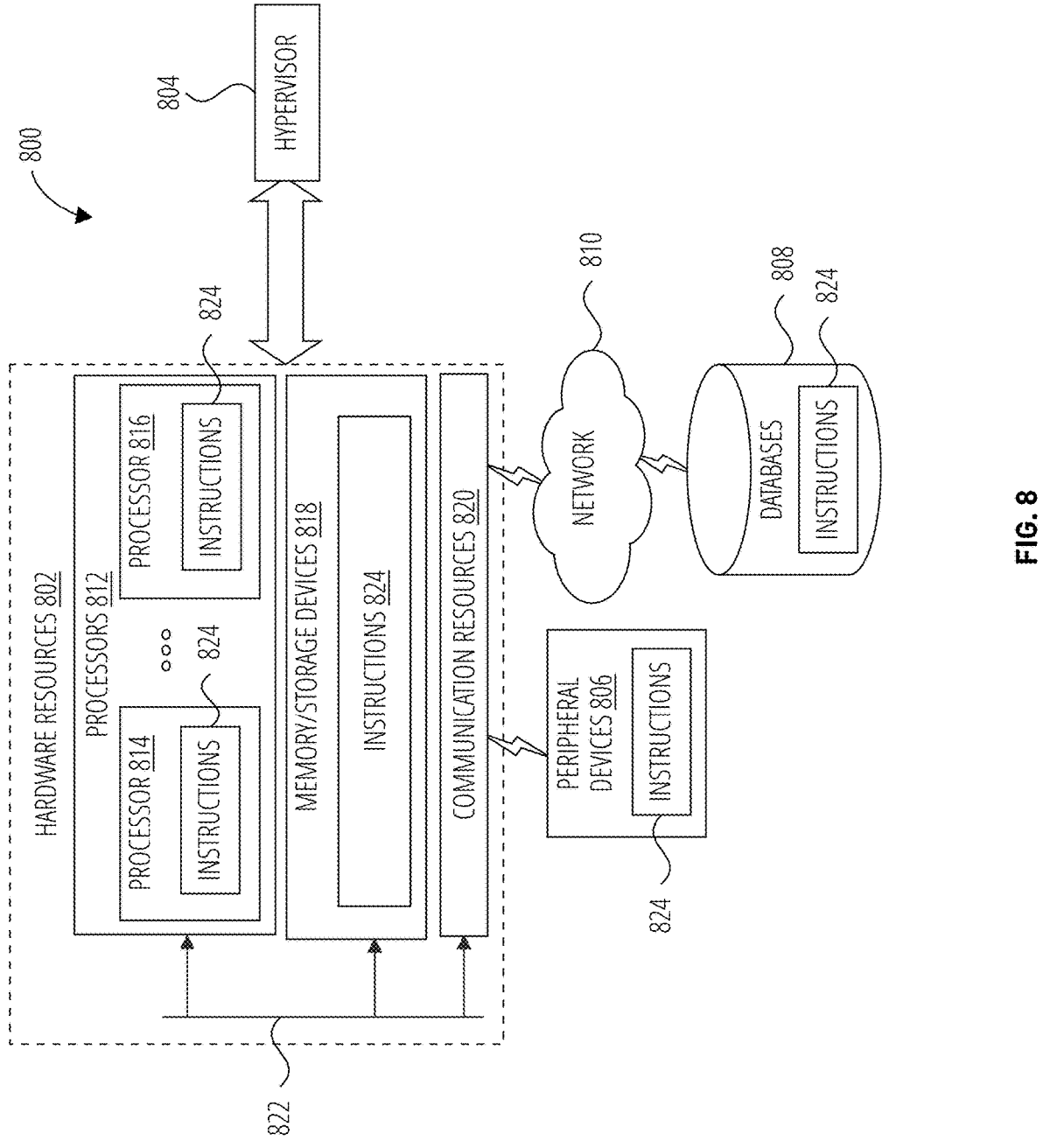
FIG. 8 illustrates components in accordance with one embodiment.

FIG. 8 is a block diagram illustrating components 800, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 802 including one or more processors 812 (or processor cores), one or more memory/storage devices 818, and one or more communication resources 820, each of which may be communicatively coupled via a bus 822. For embodiments where node virtualization (e.g., NFV) is utilized, a hypervisor 804 may be executed to provide an execution environment for one or more network slices/sub-slices to utilize the hardware resources 802.

The processors 812 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 814 and a processor 816.

The memory/storage devices 818 may include main memory, disk storage, or any suitable combination thereof. The memory/storage devices 818 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 820 may include interconnection or network interface components or other suitable devices to communicate with one or more peripheral devices 806 or one or more databases 808 via a network 810. For example, the communication resources 820 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 824 may comprise software, a program, an application, an applet, an app, or other executable code for causing at least any of the processors 812 to perform any one or more of the methodologies discussed herein. The instructions 824 may reside, completely or partially, within at least one of the processors 812 (e.g., within the processor's cache memory), the memory/storage devices 818, or any suitable combination thereof. Furthermore, any portion of the instructions 824 may be transferred to the hardware resources 802 from any combination of the peripheral devices 806 or the databases 808. Accordingly, the memory of the processors 812, the memory/storage devices 818, the peripheral devices 806, and the databases 808 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a method of determining a plurality of data objects, each data object corresponding to a New Radio (NR) channel using a first subcarrier spacing (SCS) and comprising an NR channel raster position and an Synchro- $F_{REF}$ is the given RF reference frequency; $F_{REF\text{-}Offs}$ is a reference frequency offset; $\Delta F_{Global}$ is a granularity of a global frequency raster; $N_{REF}$ is the NR-ARFCN for the given reference frequency; and $N_{REF\text{-}Offs}$ is an NR-ARFCN offset.

Example 6 is the method of any of Examples 1-5, wherein the $N_{RB}$s are determined according to the following table:

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 | nization Signal and Physical Broadcast Channel (SSB) raster position for each NR channel; the method comprising: determining, for each data object, the NR channel raster position, wherein the NR channel raster position comprises a Radio Frequency (RF) reference frequency calculated using an Absolute Radio Frequency Channel Number (NR-ARFCN); calculating Global Synchronization Channel Number (GSCN) values for the NR channel corresponding to each data object; determining a number of Physical Resource Blocks (PRBs) of the NR channel ($N_{RB}$) corresponding to each data object based on the first SCS and a bandwidth of the given NR channel; determining a placement for the NR channel raster position of each data object; computing the edges of each NR channel corresponding to each data object based on the center frequency of the given NR channel and the placement of the NR channel raster position of the data object; calculating the edges of an SSB of the NR channel corresponding to each data object based on the edges of the given NR channel; and determining the SSB raster position of each data object based on the edges of the SSB of the NR channel corresponding to the data object.

Example 2 is the method of Example 1, further comprising removing, from the plurality of data objects, all but a remaining one of the plurality of data objects that comprise an NR channel raster position corresponding to the same Long Term Evolution (LTE) channel raster position.

Example 3 is the method of Example 2, wherein the remaining one of the plurality of data objects that comprises an NR channel raster position that corresponds to the same Long Term Evolution (LTE) channel raster position is selected to remain because the $N_{RB}$ of the NR channel corresponding to the data object that is equal to or greater than an $N_{RB}$ of the NR channel corresponding to each of the other of the plurality of data objects that comprise an NR channel raster position that corresponds to the same Long Term Evolution (LTE) channel raster position.

Example 4 is the method of Example 1, further comprising removing, from the plurality of data objects, each data object that comprises an NR channel raster position that does not match an NR channel raster position of any data object of a second plurality of data objects, the second plurality of data objects each corresponding to an NR channel using a second SCS.

Example 5 is the method of any of Examples 1-4, wherein the RF reference frequencies are calculated using the formula: $F_{REF}=F_{REF\text{-}Offs}+\Delta F_{Global}(N_{REF}-N_{REF\text{-}Offs})$ wherein:

Example 7 is the method of any of Examples 1-6, wherein the placements for the NR channel raster positions each comprise: a physical resource block (PRB) number of a PRB of the NR channel corresponding to the data object comprising the NR channel raster position; and a resource element index for a resource element corresponding to the NR channel raster position within the PRB.

Example 8 is the method of Example 7, wherein the resource element index for the resource element corresponding to the NR channel raster position within the PRB is determinable based on whether the number of PRBs for the NR channel corresponding to the data object comprising the NR channel raster position is even or odd.

Example 9 is the method of any of Examples 1-8, further comprising: calculating an Occupied Channel BW (OCB) of each NR channel corresponding to each data object; and determining whether a minimum guardband is available for each NR channel corresponding to each data object on both edges of the OCB of the given channel.

Example 10 is a non-transitory computer-readable storage medium, the non-transitory computer-readable storage medium including instructions that when executed by a computer, cause the computer to: determine a New Radio (NR) channel raster position for an NR channel, wherein the NR channel raster position comprises a Radio Frequency (RF) reference frequency calculated using an Absolute Radio Frequency Channel Number (NR-ARFCN); calculate Global Synchronization Channel Number (GSCN) values for the NR channel; determine a number of Physical Resource Blocks (PRBs) for the NR channel ($N_{RB}$) based on a subcarrier spacing (SCS) used by the NR channel and a bandwidth of the NR channel; determine a placement for the NR channel raster position; compute the edges of the NR channel based on the center frequency of the NR channel and the placement of the NR channel raster position in the channel; calculate the edges of a Synchronization Signal and Physical Broadcast Channel (SSB) of the NR channel based on the edges of the NR channel; and determine an SSB raster position of the NR channel based on the edges of the SSB.

Example 11 is the non-transitory computer-readable storage medium of Example 10, wherein the RF reference frequency is calculated using the formula $F_{REF}=F_{REF\text{-}Offs}+\Delta F_{Global}(N_{REF}-N_{REF\text{-}Offs})$ wherein: $F_{REF}$ is the RF reference frequency; $F_{REF\text{-}Offs}$ is a reference frequency offset; $\Delta F_{Global}$ is a granularity of a global frequency raster; $N_{REF}$ is the NR-ARFCN for the reference frequency; and $N_{REF\text{-}Offs}$ is an NR-ARFCN offset.

Example 12 is the non-transitory computer-readable storage medium of any of Examples 10-11, wherein the $N_{RB}$ is determined according to the following table:

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Example 13 is the non-transitory computer-readable storage medium of any of Examples 10-12, wherein the placement for the NR channel raster position comprises: a physical resource block (PRB) number of a PRB of the channel corresponding to the NR channel raster position; and a resource element index for a resource element corresponding to the NR channel raster position within the PRB.

Example 14 is the non-transitory computer-readable storage medium of Example 13, wherein the resource element index for the resource element corresponding to the NR channel raster position within the PRB is determinable based on whether the number of PRBs for the NR channel is even or odd.

Example 15 is the non-transitory computer-readable storage medium of any of Examples 10-15, the non-transitory computer-readable storage medium further including instructions that when executed by the computer, cause the computer to: calculate an Occupied Channel BW (OCB) of the NR channel; and determine whether a minimum guardband is available for the channel on both edges of the OCB.

Example 16 is a non-transitory computer-readable storage medium, the non-transitory computer-readable storage medium including instructions that when executed by a computer, cause the computer to: down select from a plurality of data objects, each data object corresponding to a New Radio (NR) channel using a first subcarrier spacing (SCS) and comprising an NR channel raster position and a Synchronization Signal and Physical Broadcast Channel (SSB) raster position for each NR channel using the first SCS, wherein down selecting is performed by removing all but a remaining one of the plurality of data objects that comprises an NR channel raster position corresponding to the same Long Term Evolution (LTE) channel raster position.

Example 17 is the non-transitory computer-readable storage medium of Example 16, wherein the remaining one of the plurality of data objects that comprise an NR channel raster position that corresponds to the same Long Term Evolution (LTE) channel raster position is selected to remain because it comprises an $N_{RB}$ that is equal to or greater than an $N_{RB}$ of each of the other of the plurality of data objects that comprise an NR channel raster position that corresponds to the same Long Term Evolution (LTE) channel raster position.

Example 18 is the non-transitory computer-readable storage medium of Example 16, wherein the down selecting is further performed by removing each data object that comprises a NR channel raster position that does not match an NR channel raster position of any data object of a second plurality of data objects, the second plurality of data objects each corresponding to an NR channel using a second SCS.

Example 19 may include a method of operating an NR cellular system utilizing channel raster entry among set of values of $F_{REF}$, where $F_{REF}=F_{REF\text{-}Offs}+\Delta F_{Global}$ ($N_{REF}-N_{REF\text{-}Offs}$), and $\Delta F_{Global}=15$ kHz, $F_{REF\text{-}Offs}=3000$ MHz, $N_{REF\text{-}Offs}=600000$, and $N_{REF}$ is one of {744000, 745344, 746664, 748008, 749328, 750672, 751992, 753336, 754656, 754668, 754680, 756000, 765336, 766656, 766668, 766680, 768000, 769344, 770664, 772008, 773328, 774672, 775992, 777336, 778656, 778668, 778680, 780000, 781344, 783000, 784344, 785664, 787008, 788328, 789672, 790992, 792336, 793656, 793668, 793680, 744660, 746004, 747324, 748668, 749988, 750000, 750012, 751332, 752676, 753996, 755340, 765996, 767340, 768660, 770004, 771324, 772668, 773988, 774000, 774012, 775332, 776676, 777996, 779340, 780660, 783660, 785004, 786324, 787668, 788988, 789000, 789012, 790332, 791676, 792996} or {744000, 744006, 745344, 746664, 746670, 748008, 749328, 749334, 750672, 751992, 51998, 753336, 754656, 754662, 756000, 756006, 765336, 766656, 766662, 768000, 768006, 69344, 770664, 770670, 772008, 773328, 773334, 774672, 775992, 775998, 777336, 78656, 778662, 780000, 780006, 781344, 783000, 783006, 784344, 785664, 785670, 787008, 788328, 788334, 789672, 790992, 790998, 792336, 793656, 793662, 744660, 744666, 746004, 747324, 47330, 748668, 749988, 749994, 750000, 750012, 751332, 751338, 752676, 753996, 754002, 755340, 765996, 766002, 767340, 768660, 768666, 770004, 771324, 771330, 772668, 773988, 773994, 774000, 774012, 775332, 775338, 776676, 777996, 778002, 779340, 780660, 780666, 783660, 783666, 785004, 786324, 786330, 787668, 788988, 788994, 789000, 789012, 790332, 790338, 791676, 792996, 793002}

Example 20 may include the method of example 1 or some other example herein, where NR channel raster entries are selected from a subset of the entries in example 1, where the subset is a set of values of $F_{REF}$, where $F_{REF}=F_{REF\text{-}Offs}+\Delta F_{Global}$ ($N_{REF}-N_{REF\text{-}Offs}$), and $\Delta F_{Global}=15$ kHz, $F_{REF\text{-}Offs}=3000$ MHz, $N_{REF\text{-}Offs}=600000$, and $N_{REF}$ is {744000, 745344, 746664, 748008, 749328, 750672, 751992, 753336, 754668, 756000, 765336, 766668, 768000, 769344, 770664, 772008, 773328, 774672, 775992, 777336, 778668, 780000, 781344, 783000, 784344, 785664, 787008, 788328, 789672, 790992, 792336, 793668, 744660, 746004, 747324, 748668, 750000, 751332, 752676, 753996, 755340, 765996, 767340, 768660, 770004, 771324, 772668, 774000, 775332, 776676, 777996, 779340, 780660, 783660, 785004, 786324, 787668, 789000, 790332, 791676, 792996}

Example 21 may include the method of example 1 or 2 or some other example herein, where corresponding SSB raster entry for a given NR channel entry is given by "3000 MHz+N*1.44 MHz", where N is a value from range 0 to 14756 and GSCN is given as "7499+N", where the GSCN is K+a value from set {8996, 9010, 9023, 9037, 9051, 9065, 9079, 9093, 9107, 9121, 9218, 9232, 9232, 9232, 9246, 9260, 9273, 9287, 9301, 9315, 9329, 9343, 9357, 9357, 9357, 9371, 9385, 9402, 9416, 9430, 9444, 9457, 9471, 9485, 9499, 9513, 9513, 9513, 8996, 9010, 9023, 9037, 9051, 9065, 9079, 9093, 9107, 9218, 9232, 9246, 9260, 9273, 9287}, where K=0 . . . 6.

Example 22 may include an apparatus comprising means to perform one or more elements of a method described in or related to any of the above Examples, or any other method or process described herein.

Example 23 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 24 may include an apparatus comprising logic, modules, or circuitry to perform one or more elements of a method described in or related to any of the above Examples, or any other method or process described herein.

Example 25 may include a method, technique, or process as described in or related to any of the above Examples, or portions or parts thereof.

Example 26 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 27 may include a signal as described in or related to any of the above Examples, or portions or parts thereof.

Example 28 may include a datagram, packet, frame, segment, protocol data unit (PDU), or message as described in or related to any of the above Examples, or portions or parts thereof, or otherwise described in the present disclosure.

Example 29 may include a signal encoded with data as described in or related to any of the above Examples, or portions or parts thereof, or otherwise described in the present disclosure.

Example 30 may include a signal encoded with a datagram, packet, frame, segment, PDU, or message as described in or related to any of the above Examples, or portions or parts thereof, or otherwise described in the present disclosure.

Example 31 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 32 may include a computer program comprising instructions, wherein execution of the program by a processing element is to cause the processing element to carry out the method, techniques, or process as described in or related to any of the above Examples, or portions thereof.

Example 33 may include a signal in a wireless network as shown and described herein.

Example 34 may include a method of communicating in a wireless network as shown and described herein.

Example 35 may include a system for providing wireless communication as shown and described herein.

Example 36 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A non-transitory computer-readable storage medium, the non-transitory computer-readable storage medium including instructions that when executed by a computer, cause the computer to:

down select from a plurality of data objects, each data object corresponding to a New Radio (NR) channel using a first subcarrier spacing (SCS) and comprising an NR channel raster position and a Synchronization Signal and Physical Broadcast Channel (SSB) raster position for each NR channel using the first SCS, wherein down selecting is performed by removing all but a remaining one of the plurality of data objects that comprises an NR channel raster position corresponding to the same Long Term Evolution (LTE) channel raster position; and search for a valid SSB, based on the NR channel raster position and the SSB raster position, during an initial access procedure.

2. The non-transitory computer-readable storage medium of claim 1, wherein the remaining one of the plurality of data objects that comprise an NR channel raster position that corresponds to the same LTE channel raster position is selected to remain because it comprises an NRB that is equal to or greater than an NRB of each of the other of the plurality of data objects that comprise an NR channel raster position that corresponds to the same LTE channel raster position.

3. The non-transitory computer-readable storage medium of claim 1, wherein the instructions when executed by the computer, further cause the computer to remove, from the plurality of data objects, each data object that comprises an NR channel raster position that does not match an NR channel raster position of any data object of a second plurality of data objects, the second plurality of data objects each corresponding to an NR channel using a second SCS.

4. The non-transitory computer-readable storage medium of claim 1, wherein placements for the NR channel raster positions each comprise:

a physical resource block (PRB) number of a PRB of the NR channel corresponding to the data object comprising the NR channel raster position; and a resource element index for a resource element corresponding to the NR channel raster position within the PRB.

5. The non-transitory computer-readable storage medium of claim 4, wherein the resource element index for the resource element corresponding to the NR channel raster position within the PRB is determinable based on whether the number of PRBs for the NR channel corresponding to the data object comprising the NR channel raster position is even or odd.

6. The non-transitory computer-readable storage medium of claim 1, wherein the NR channel raster position supports a number of physical resource blocks (PRBs) within a channel band.

7. The non-transitory computer-readable storage medium of claim 6, wherein the NR channel raster position supports 50 PRBs within a 20 MHz channel band.

8. An apparatus of a computer, the apparatus comprising:

a memory to store a plurality of data objects; and one or more processors configured to cause the computer to:

down select from the plurality of data objects, each data object corresponding to a New Radio (NR) channel using a first subcarrier spacing (SCS) and comprising an NR channel raster position and a Synchronization Signal and Physical Broadcast Channel (SSB) raster position for each NR channel using the first SCS, wherein down selecting is performed by removing all but a remaining one of the plurality of data objects that comprises an NR channel raster position corresponding to the same Long Term Evolution (LTE) channel raster position; and search for a valid SSB, based on the NR channel raster position and the SSB raster position, during an initial access procedure.

9. The apparatus of claim 8, wherein the remaining one of the plurality of data objects that comprise an NR channel raster position that corresponds to the same LTE channel raster position is selected to remain because it comprises an NRB that is equal to or greater than an NRB of each of the other of the plurality of data objects that comprise an NR channel raster position that corresponds to the same LTE channel raster position.

10. The apparatus of claim 8, wherein the one or more processors are further configured to cause the computer to, further cause the computer to remove, from the plurality of data objects, each data object that comprises an NR channel raster position that does not match an NR channel raster position of any data object of a second plurality of data objects, the second plurality of data objects each corresponding to an NR channel using a second SCS.

11. The apparatus of claim 8, wherein placements for the NR channel raster positions each comprise:

a physical resource block (PRB) number of a PRB of the NR channel corresponding to the data object comprising the NR channel raster position; and a resource element index for a resource element corresponding to the NR channel raster position within the PRB.

12. The apparatus of claim 11, wherein the resource element index for the resource element corresponding to the NR channel raster position within the PRB is determinable based on whether the number of PRBs for the NR channel corresponding to the data object comprising the NR channel raster position is even or odd.

13. The apparatus of claim 8, wherein the NR channel raster position supports a number of physical resource blocks (PRBs) within a channel band.

14. The apparatus of claim 13, wherein the NR channel raster position supports 50 PRBs within a 20 MHz channel band.

15. A method of a computer, comprising:

down selecting from a plurality of data objects, each data object corresponding to a New Radio (NR) channel using a first subcarrier spacing (SCS) and comprising an NR channel raster position and a Synchronization Signal and Physical Broadcast Channel (SSB) raster position for each NR channel using the first SCS, wherein down selecting is performed by removing all but a remaining one of the plurality of data objects that comprises an NR channel raster position corresponding to the same Long Term Evolution (LTE) channel raster position; and searching for a valid SSB, based on the NR channel raster position and the SSB raster position, during an initial access procedure.

16. The method of claim 15, wherein the remaining one of the plurality of data objects that comprise an NR channel raster position that corresponds to the same LTE channel raster position is selected to remain because it comprises an NRB that is equal to or greater than an NRB of each of the other of the plurality of data objects that comprise an NR channel raster position that corresponds to the same LTE channel raster position.

17. The method of claim 15, further comprising removing, from the plurality of data objects, each data object that comprises an NR channel raster position that does not match an NR channel raster position of any data object of a second plurality of data objects, the second plurality of data objects each corresponding to an NR channel using a second SCS.

18. The method of claim 15, wherein placements for the NR channel raster positions each comprise:

a physical resource block (PRB) number of a PRB of the NR channel corresponding to the data object comprising the NR channel raster position; and a resource element index for a resource element corresponding to the NR channel raster position within the PRB.

19. The method of claim 18, wherein the resource element index for the resource element corresponding to the NR channel raster position within the PRB is determinable based on whether the number of PRBs for the NR channel corresponding to the data object comprising the NR channel raster position is even or odd.

20. The method of claim 15, wherein the NR channel raster position supports a number of physical resource blocks (PRBs) within a channel band.

* * * * *